(12) United States Patent
Inoue et al.

(10) Patent No.: US 10,897,297 B2
(45) Date of Patent: Jan. 19, 2021

(54) TRANSMISSION AND RECEPTION APPARATUS

(71) Applicant: NTT DOCOMO, INC., Tokyo (JP)

(72) Inventors: Yuki Inoue, Tokyo (JP); Satoshi Suyama, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/491,432

(22) PCT Filed: Mar. 5, 2018

(86) PCT No.: PCT/JP2018/008375
§ 371 (c)(1),
(2) Date: Sep. 5, 2019

(87) PCT Pub. No.: WO2018/164066
PCT Pub. Date: Sep. 13, 2018

(65) Prior Publication Data
US 2020/0028556 A1    Jan. 23, 2020

(30) Foreign Application Priority Data

Mar. 6, 2017  (JP) ................................. 2017-041723

(51) Int. Cl.
*H04B 7/02* (2018.01)
*H04B 7/06* (2006.01)
(Continued)

(52) U.S. Cl.
CPC ......... *H04B 7/0617* (2013.01); *H04B 7/0413* (2013.01); *H04B 7/0456* (2013.01)

(58) Field of Classification Search
CPC ... H04B 7/0617; H04B 7/0413; H04B 7/0456
(Continued)

(56) References Cited

U.S. PATENT DOCUMENTS

| | | | |
|---|---|---|---|
| 6,642,908 B2 * | 11/2003 | Pleva | G01S 13/346 343/876 |
| 8,369,436 B2 * | 2/2013 | Stirling-Gallacher | H04B 7/0408 375/267 |

(Continued)

FOREIGN PATENT DOCUMENTS

| | | |
|---|---|---|
| JP | H10-190539 A | 7/1998 |
| JP | 2000-244224 A | 9/2000 |

OTHER PUBLICATIONS

International Search Report issued in PCT/JP2018/008375 dated May 22, 2018 (5 pages).

(Continued)

*Primary Examiner* — Helene E Tayong
(74) *Attorney, Agent, or Firm* — Osha Bergman Watanabe & Burton LLP

(57) ABSTRACT

A transmission and reception apparatus includes a plurality of antenna ports. The transmission and reception apparatus includes at least one orthogonal beam fixed beamforming circuit and a high-speed switching circuit between a transmission and reception circuit and the antenna ports. For example, the transmission and reception circuit outputs a transmission signal subjected to transmission signal processing to the high-speed switching circuit during signal transmission, the high-speed switching circuit selects at least one port from a plurality of ports provided at the orthogonal beamforming circuit, and outputs the transmission signal to the selected port, and the orthogonal beamforming circuit forms a beam corresponding to the selected port to transmit the transmission signal.

6 Claims, 16 Drawing Sheets

(51) Int. Cl.
*H04B 7/0413* (2017.01)
*H04B 7/0456* (2017.01)

(58) Field of Classification Search
USPC .......................................... 375/267
See application file for complete search history.

(56) References Cited

U.S. PATENT DOCUMENTS

| | | | |
|---|---|---|---|
| 2004/0121810 A1* | 6/2004 | Goransson | H04B 7/0615 455/562.1 |
| 2005/0286650 A1* | 12/2005 | Han | H04B 7/0417 375/267 |
| 2014/0086071 A1* | 3/2014 | Hu | H04J 3/14 370/252 |
| 2017/0163325 A1* | 6/2017 | Kang | H04W 72/02 |
| 2017/0181010 A1* | 6/2017 | Burgess | H04W 16/28 |
| 2018/0191422 A1* | 7/2018 | Xia | H04B 7/0695 |

OTHER PUBLICATIONS

Written Opinion of the International Searching Authority issued in PCT/JP2018/008375 dated May 22, 2018 (5 pages).
NTT DOCOMO, Inc.; "DOCOMO 5G White Paper"; Sep. 2014 (27 pages).
Suyama, S. et al.; "5G Multi-antenna Technology"; NTT DOCOMO Technical Journal, vol. 23, No. 4, Jan. 2016, pp. 29-39 (23 pages).

* cited by examiner

TRANSMISSION AND RECEPTION APPARATUS

TECHNICAL FIELD

The present invention relates to a transmission and reception apparatus.

BACKGROUND ART

Long Term Evolution (LTE) has been specified for achieving a higher data rate, lower latency, and the like in a Universal Mobile Telecommunications System (UMTS) network. Successor systems of LTE (e.g., the systems called LTE-A (LTE-Advanced), FRA (Future Radio Access), 5G (5th generation mobile communication system), 5G+ (5G plus), and New-RAT (Radio Access Technology)) have been also studied for achieving a broader bandwidth and a higher speed based on LTE.

In a future radio communication system (for example 5G), to realize further higher speed of signal transmission and to reduce interference, use of Massive MIMO (Multiple Input Multiple Output) in which a number of antenna elements (for example, equal to or more than 100 elements) are used in a high frequency band (for example, equal to or higher than 5 GHz) is being studied.

In Massive MIMO, it is possible to perform advanced beamforming using a number of antenna elements compared to conventional MIMO. Beamforming is a technology of controlling directions and shapes of beams of radio waves to be emitted from an antenna configured with a plurality of antenna elements by adjusting phases and amplitudes of electrical signals by providing weights (weighting coefficients) to the electrical signals to be supplied to the antenna elements, and includes pre-coding.

As a technology for controlling beams or streams in MIMO, there are analog beamforming, digital pre-coding and hybrid beamforming which is combination of the analog beamforming and the digital pre-coding. In the hybrid beamforming, first, digital pre-coding is performed, and, then, analog beamforming is performed.

For example, NPL 1 and NPL 2 disclose a transmission apparatus including a digital pre-coder which performs digital pre-coding, and an analog beamforming circuit (hereinafter, also referred to as an analog BF (Beamforming) circuit) which adjusts phases and amplitudes of L OFDM symbols which are subjected to digital pre-coding and which are converted into a time domain and outputs the L OFDM symbols to N antenna elements.

CITATION LIST

Non-Patent Literature

NPL 1
NTT DOCOMO, INC., "DOCOMO 5G White Paper", September, 2014
NPL 2
NTT DOCOMO, INC., NTT DOCOMO Technical Journal "5G Multi-Antenna Technology", January, 2016

SUMMARY OF INVENTION

Technical Problem

However, in an analog BF circuit, in order to switch beams at high speed in synchronization with transmission timings of OFDM symbols, it is necessary to control a phase adjusting circuit which adjusts phases and an amplitude adjusting circuit which adjusts amplitudes at high speed.

According to one aspect of the present invention, a transmission and reception apparatus which can switch beams at high speed without controlling adjustment of phases and adjustment of amplitudes at high speed is provided.

Solution to Problem

A transmission and reception apparatus according to one aspect of the present invention is a transmission and reception apparatus which includes a plurality of antenna ports, the transmission and reception apparatus including a transmission and reception circuit, and a orthogonal beam fixed beamforming circuit and a high-speed switching circuit between the transmission and reception circuit and the antenna ports.

Advantageous Effects of Invention

According to one aspect of the present invention, it is possible to switch beams at high speed without controlling adjustment of phases and adjustment of amplitudes at high speed.

DESCRIPTION OF EMBODIMENTS

Embodiment 1

<Radio Communication System>

Figure 1:
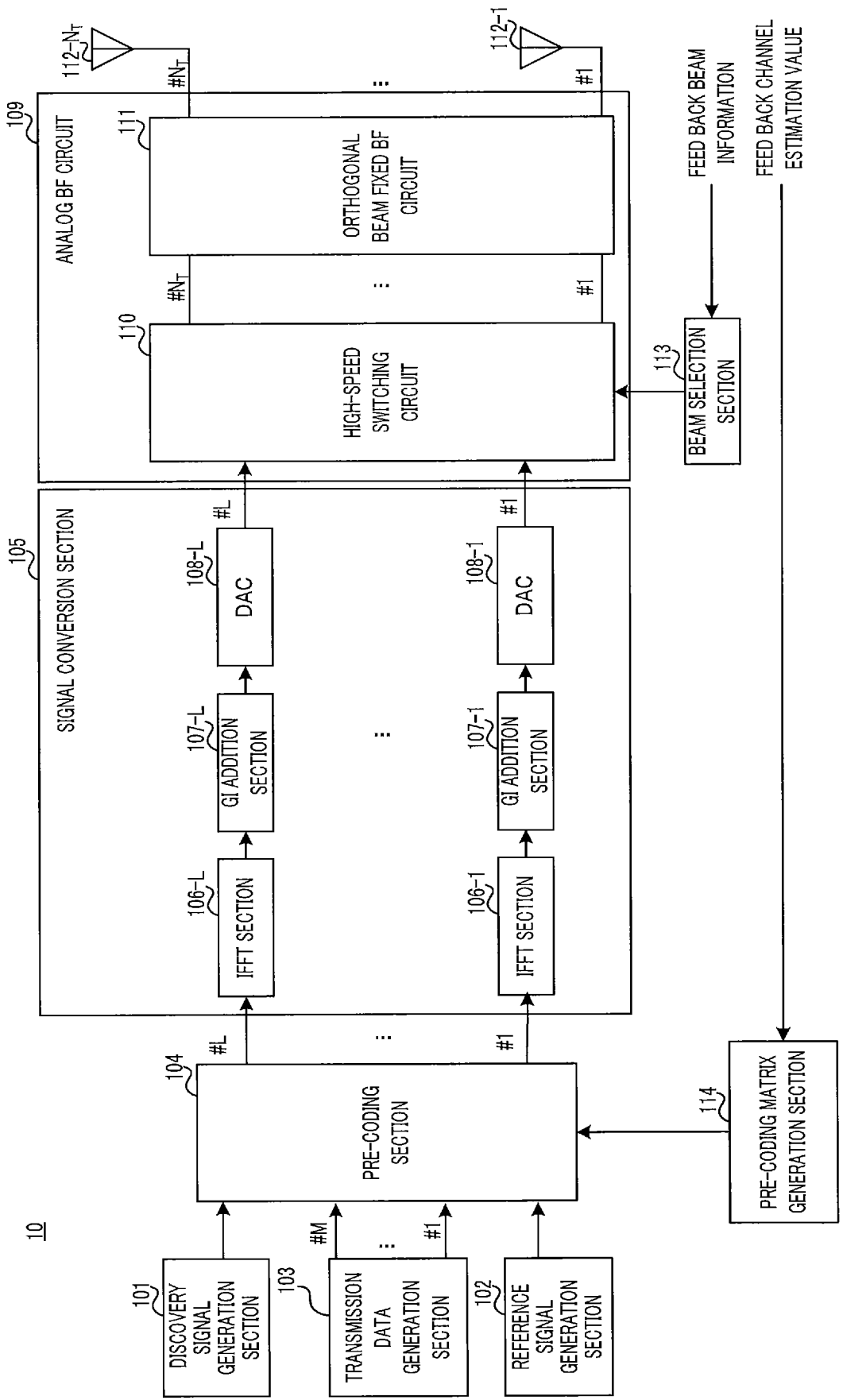
FIG. 1 is a block diagram illustrating a configuration example of a transmission apparatus according to Embodiment 1.
Figure 2:
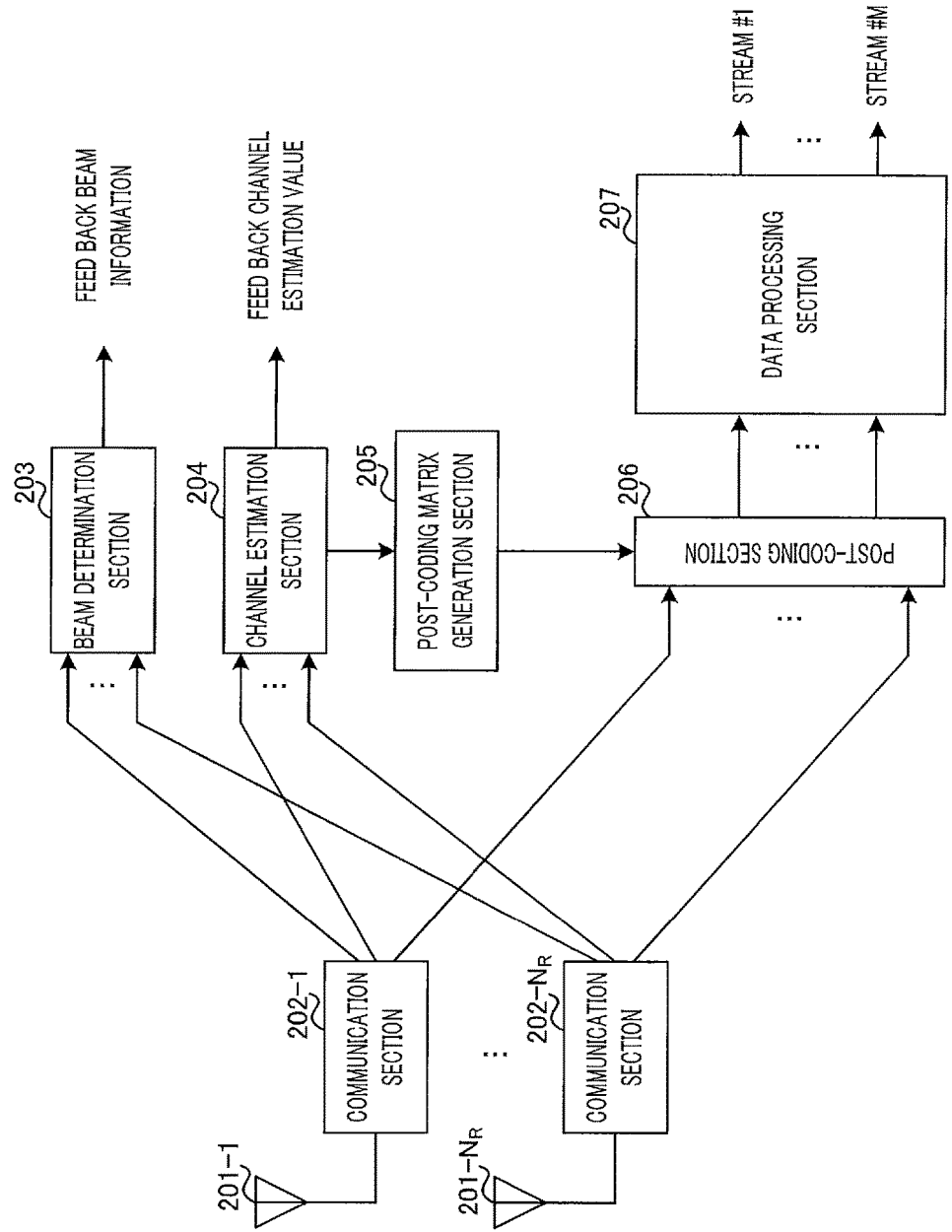
FIG. 2 is a block diagram illustrating a configuration example of a reception apparatus according to Embodiment 1.

A radio communication system according to the present embodiment includes transmission apparatus 10 illustrated in FIG. 1 and reception apparatus 20 illustrated in FIG. 2. Transmission apparatus 10 is, for example, a Massive MIMO base station, and reception apparatus 20 is a user terminal.

<Transmitting Apparatus>

FIG. 1 is a block diagram illustrating a configuration example of transmission apparatus 10 according to Embodiment 1. Transmission apparatus 10 illustrated in FIG. 1 includes discovery signal generation section 101, reference signal generation section 102, transmission data generation section 103, pre-coding section 104, signal conversion section 105, analog BF (Beamforming) circuit 109, antenna ports 112-1 to 112-$N_T$, beam selection section 113 and pre-coding matrix generation section 114.

Discovery signal generation section 101 generates discovery signals for determining beams to be used for communication with reception apparatus 20 (for example, a user terminal) For example, discovery signal generation section 101 generates at least discovery signals of the same number as the number of candidates for beams. Discovery signal generation section 101 outputs the generated discovery signals to pre-coding section 104.

Reference signal generation section 102 generates reference signals to be used for channel estimation (for example, reference signals for channel estimation such as a CSI-RS (Channel State Information-Reference Signal)) and outputs the reference signals to pre-coding section 104.

Transmission data generation section 103 generates data for reception apparatus 20 (for example, a user terminal). Specifically, transmission data generation section 103 encodes data signals of M streams respectively corresponding to the number of streams (M) for the user terminal, modulates each of the encoded data signals and outputs the modulated data signals to pre-coding section 104.

Pre-coding section 104 multiplies input signals (at least one of the discovery signals, the reference signals and the data signals) by a pre-coding matrix and outputs the signal subjected to pre-coding to signal conversion section 105.

For example, pre-coding section 104 applies pre-coding to the data signals of M streams on the basis of a pre-coding matrix output from pre-coding matrix generation section 114 which will be described later to generate L signals (where L is the number of beams, and L>M, for example). Further, pre-coding section 104 applies pre-coding to the discovery signals on the basis of a fixed pre-coding matrix to generate L signals. Still further, pre-coding section 104 applies pre-coding to the reference signals on the basis of the fixed pre-coding matrix to generate L signals.

Signal conversion section 105 performs signal processing on each of the L signals subjected to pre-coding to convert the L signals into L transmission signals.

Specifically, signal conversion section 105 includes IFFT sections 106-1 to 106-L, GI addition sections 107-1 to 107-L and digital to analog converters (DACs. Hereinafter, referred to as DACs) 108-1 to 108-L. Each of IFFT sections 106-1 to 106-L, GI addition sections 107-1 to 107-L and DACs 108-1 to 108-L is provided to each of L sequences.

IFFT sections 106-$i$ ($i$ is an integer between one and L) perform IFFT (Inversed Fast Fourier Transform) processing on an i-th sequence (#i) subjected to pre-coding to convert the i-th sequence into signals in a time domain.

GI addition section 107-$i$ adds guard intervals (GIs) to the digital signals in the time domain output from the IFFT section 106-$i$.

DAC 108-$i$ converts the digital signals output from GI addition section 107-$i$ into analog signals.

Note that a frequency conversion section which is not illustrated may be provided after the DAC to up-convert the analog signals.

Signal conversion section 105 outputs L transmission signals subjected to the above-described processing to analog BF circuit 109.

Analog BF circuit 109 provides weights for adjusting phases and/or amplitudes to the L transmission signals so that the L transmission signals are transmitted using L beams which are orthogonal to each other.

Specifically, analog BF circuit 109 includes high-speed switching circuit 110 and orthogonal beam fixed BF (Beamforming) circuit 111.

High-speed switching circuit 110 has L input ports and $N_T$ output ports. To each of the L input ports, the L transmission signals output from signal conversion section 105 are input, respectively. High-speed switching circuit 110 selects L output ports from $N_T$ output ports and outputs the L transmission signals respectively from the selected L output ports.

In the case where the discovery signals are transmitted, high-speed switching circuit 110 outputs each of the L transmission signals (discovery signals) while changing combination of the L output ports by switching selection of the L output ports at high speed. Further, in the case where the reference signals are transmitted, high-speed switching circuit 110 selects L output ports corresponding to beams selected by beam selection section 113 which will be described later and beams around the beams. Further, in the case where the data signals are transmitted, high-speed switching circuit 110 selects L output ports corresponding to the beams selected by beam selection section 113 which will be described later.

Orthogonal beam fixed BF circuit 111 has $N_T$ input ports connected to the $N_T$ output ports of high-speed switching circuit 110 and $N_T$ output ports connected to the $N_T$ antenna ports. By orthogonal beam fixed BF circuit 111 providing fixed weights to signals input from the input ports, $N_T$ beams respectively corresponding to the $N_T$ input ports are generated. The $N_T$ beams are orthogonal to each other.

To orthogonal beam fixed BF circuit 111, L transmission signals are input from L input ports connected to L output ports selected by high-speed switching circuit 110 among the $N_T$ input ports. Orthogonal beam fixed BF circuit 111 provides a fixed weight to each of the L transmission signals and outputs the weighted transmission signals to the $N_T$ antenna ports.

A configuration of orthogonal beam fixed BF circuit 111 will be described later.

Antenna ports 112-1 to 112-$N_T$ transmit the signals output from orthogonal beam fixed BF circuit 111. The signals to be transmitted from the $N_T$ antenna ports form L beams which are orthogonal to each other. The L transmission signals are respectively transmitted using the L beams. While, in the above description, 112-1 to 112-$N_T$ are defined as antenna ports, antenna ports may be defined at output of signal conversion section 105, for example, between signal conversion section 105 and analog BF circuit 109.

Note that a communication section which is not illustrated may be provided between antenna ports 112-1 to 112-$N_T$ and orthogonal beam fixed BF circuit 111. The communication section may perform predetermined transmission processing such as frequency conversion of the transmission signals.

Beam selection section 113 selects beams to be used for communication with reception apparatus 20 on the basis of an index of beams which can be used for communication, included in beam information fed back from reception apparatus 20. Information fed back from reception apparatus 20 may include a CQI (Channel Quality Indicator) of the discovery signals transmitted by transmission apparatus 10 and/or the number of MIMO multiplexing.

Pre-coding matrix generation section 114 generates a pre-coding matrix using a channel estimation value included in the information fed back from reception apparatus 20. Pre-coding matrix generation section 114 outputs the generated pre-coding matrix to pre-coding section 104.

<Reception Apparatus>

FIG. 2 is a block diagram illustrating a configuration example of reception apparatus 20 according to Embodiment 1. Reception apparatus 20 illustrated in FIG. 2 includes antenna ports 201-1 to 201-$N_R$, communication sections 202-1 to 202-$N_R$, beam determination section 203, channel estimation section 204, post-coding matrix generation section 205, post-coding section 206 and data processing section 207. While, in the above description, 201-1 to 201-$N_R$ are defined as antenna ports, antenna ports may be defined at output of communication sections 202-1 to 202-$N_R$.

Note that description of components (for example, a GI removal section, an FFT processing section), or the like, for receiving OFDM signals at reception apparatus 20 is omitted.

Communication sections 202-1 to 202-$N_R$ are provided so as to respectively correspond to $N_R$ antenna ports 201. Each communication section 202 performs reception processing such as down-conversion and A/D conversion on received signals received via antenna port 201. Here, the received signals include, for example, the discovery signals, the reference signals or the data signals. Communication section 202 outputs the discovery signals to beam determination section 203, outputs the reference signals to channel estimation section 204 and outputs the data signals to post-coding section 206.

Beam determination section 203 calculates a CQI using the discovery signals input from communication section 202. The discovery signals are transmitted using L beams which are orthogonal to each other. Therefore, beam determination section 203 determines L beams with the highest CQI as candidates for beams on the basis of the CQI of the discovery signals transmitted using the L beams. The determination result indicating the determined candidates for beams is, for example, fed back to transmission apparatus 10 via communication section 202.

Channel estimation section 204 estimates a channel estimation value (channel information) indicating a channel between transmission apparatus 10 and reception apparatus 20 using the reference signals input from communication section 202. The estimated channel information is, for example, fed back to transmission apparatus 10 via communication section 202. Further, channel estimation section 204 outputs the estimated channel information to post-coding matrix generation section 205.

Post-coding matrix generation section 205 generates a post-coding matrix using the channel information input from channel estimation section 204. Post-coding matrix generation section 205 outputs the generated post-coding matrix to post-coding section 206.

Post-coding section 206 performs post-coding on the data signals input from communication section 202 using the post-coding matrix input from post-coding matrix generation section 205. Post-coding section 206 outputs the data signals subjected to post-coding to data processing section 207.

Data processing section 207 performs reception processing (including demodulation processing and decoding processing) on the data signals input from post-coding section 206 to obtain a plurality of streams (streams #1 to #M).

<Operation of Transmission Apparatus 10 and Reception Apparatus 20>

An example of operation of transmission apparatus 10 and reception apparatus 20 described above will be described next. Operation described below is operation relating to transmission and reception of the discovery signals and transmission and reception of the reference signals for channel estimation.

Transmission apparatus 10 generates the discovery signals which are orthogonal on at least one axis of a time axis, a code axis and a frequency axis. Transmission apparatus 10 then transmits the discovery signals using L beams among $N_T$ beams. Transmission apparatus 10 transmits all the discovery signals (initial discovery signals) while regularly switching the L beams.

Reception apparatus 20 receives the discovery signals and calculates a CQI of each discovery signal. Reception apparatus 20 then determines an index of beams which can be used for communication on the basis of the calculated CQI. Reception apparatus 20 then feeds back beam information including the index of beams which can be used for communication to transmission apparatus 10. At this time, reception apparatus 20 may feed back the calculated CQI and/or the number of MIMO multiplexing for which reception can be performed at reception apparatus 20.

Transmission apparatus 10 transmits the reference signals for channel estimation (for example, CSI-RS) using beams corresponding to the index of beams which can be used for communication indicated in the beam information fed back from reception apparatus 20 and beams around the beams.

Reception apparatus 20 receives the reference signals for channel estimation and performs channel estimation on the basis of the received reference signals for channel estimation. Reception apparatus 20 feeds back channel information (for example, a CSI report) including the channel estimation value to transmission apparatus 10.

Transmission apparatus 10 generates a pre-coding matrix on the basis of the channel information and transmits data signals and discovery signals (discovery signals for updating) subjected to pre-coding on the basis of the pre-coding matrix.

Reception apparatus 20 receives the data signals and performs reception processing such as post-coding corresponding to pre-coding to acquire received data. Further, reception apparatus 20 receives the discovery signals and calculates a CQI of each discovery signal. Reception apparatus 20 then determines an index of beams which can be used for communication on the basis of the calculated CQI. Reception apparatus 20 then feeds back beam information including the index of beams which can be used for communication to transmission apparatus 10.

Transmission apparatus 10 updates the index of beams on the basis of the beam information fed back from reception apparatus 20. Transmission apparatus 10 then transmits the data signals on the basis of the updated index of beams.

According to such operation, because optimum beams can be determined by determining a rough beam direction using the initial discovery signals, and transmitting the discovery signals for updating around the determined beam direction with a search angle (for example, the number of beams) made smaller, it is possible to reduce overheads of the initial discovery signals. Further, because the discovery signals for updating are transmitted to part of all beam directions, it is possible to reduce the number of transmissions of the discovery signals for updating. Still further, because the discovery signals for updating can be multiplexed with the data signals, it is possible to efficiently perform data communication and beam search.

Signals to be transmitted by transmission apparatus 10 in the above-described operation of transmission apparatus 10 and reception apparatus 20 will be described.

Figure 3:
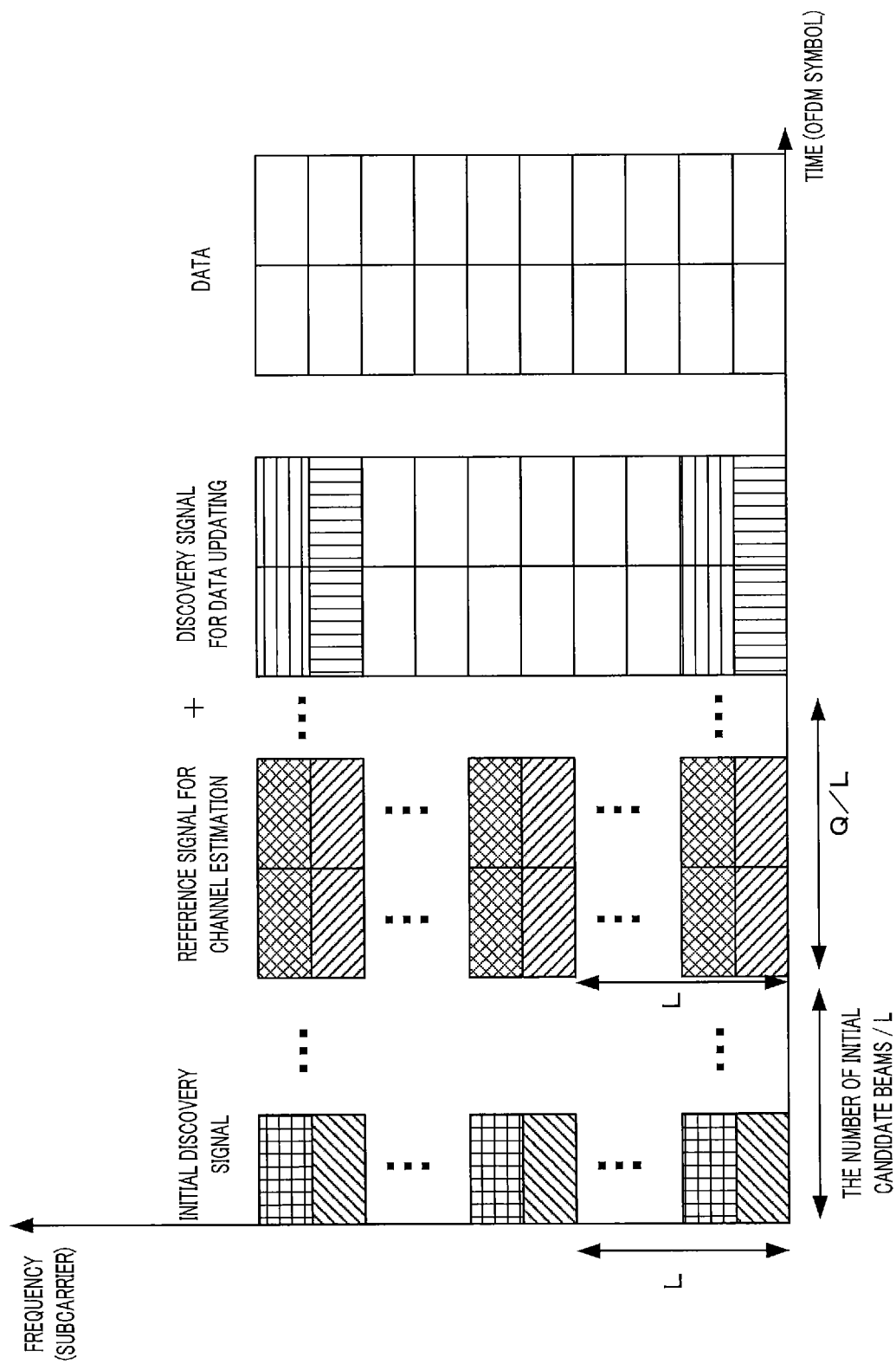
FIG. 3 illustrates an example of a transmission signal in Embodiment 1.

FIG. 3 illustrates an example of the transmission signal in Embodiment 1. The horizontal axis in FIG. 3 is a time axis which is separated in units of one symbol of OFDM symbols, and the vertical axis is a frequency axis which is separated in units of one subcarrier.

Transmission apparatus 10 first transmits the initial discovery signals. In FIG. 3, L discovery signals are multiplexed in a frequency direction and transmitted using symbols of the number of candidates for beams/L.

After reception apparatus 20 receives the initial discovery signals and feeds back beam information to the transmission apparatus 10, transmission apparatus 10 transmits the reference signals for channel estimation (for example, Q CSI-RSs). Then, after reception apparatus 20 receives the reference signals for channel estimation and feeds back the channel information to transmission apparatus 10, transmission apparatus 10 performs pre-coding and/or beamforming on the basis of the fed back information and transmits the data signals and the discovery signals for updating. Further, after transmission apparatus 10 transmits the discovery signals for updating, transmission apparatus 10 transmits the data signals.

<Orthogonal Beam Fixed BF Circuit>

A configuration of orthogonal beam fixed BF circuit 111 will be described next. Orthogonal beam fixed BF circuit 111 generates $N_T$ weighted signals which are different from each other by providing a fixed weight (for example, a fixed magnitude of an amplitude and/or a fixed magnitude of a phase) to one signal input from one input port. As a result of the $N_T$ weighted signals being respectively transmitted from $N_T$ antenna ports 112-1 to 112-$N_T$, the one signal is transmitted using one beam directed to one direction.

Orthogonal beam fixed BF circuit 111 provides fixed weights different from each other to signals input from respective input ports. By this means, transmission apparatus 10 transmits signals input from the input ports using beams different in accordance with the input ports.

For example, orthogonal beam fixed BF circuit 111 is configured using a butler matrix.

Figure 4:
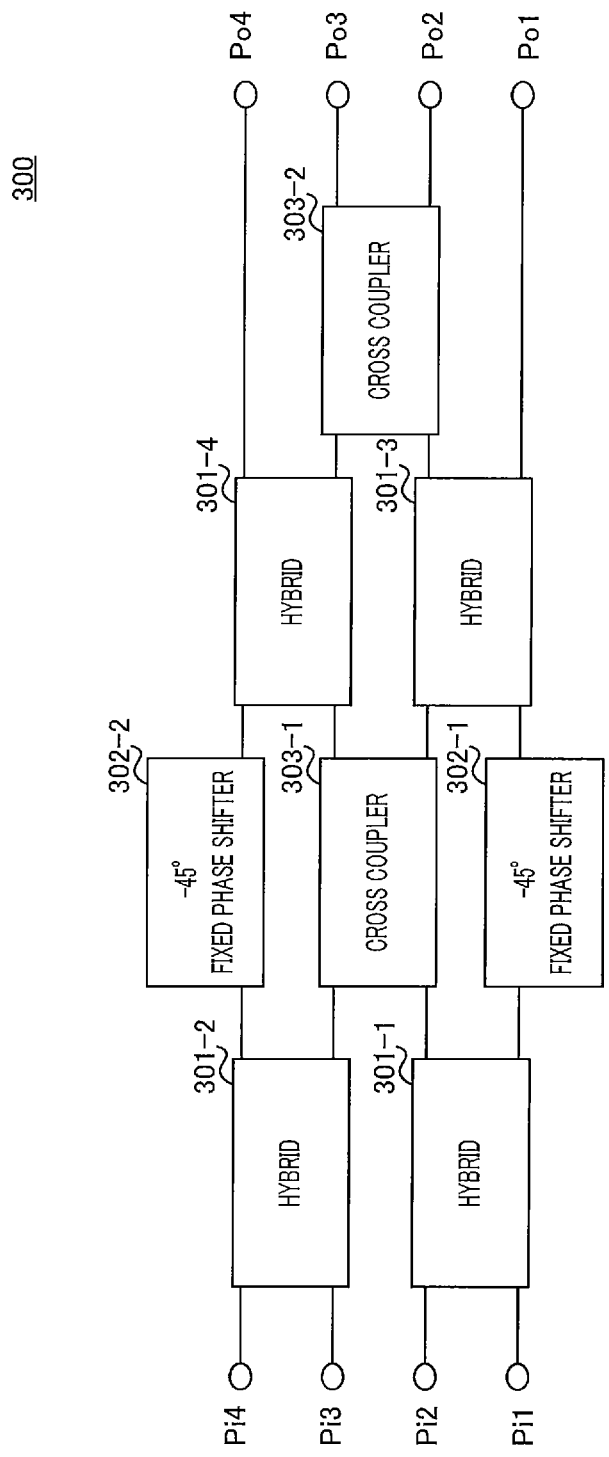
FIG. 4 illustrates an example of a 4×4 butler matrix.

FIG. 4 illustrates an example of butler matrix (4×4 butler matrix) 300.

Orthogonal beam fixed BF circuit 111 can, for example, employ a configuration of butler matrix 300 in the case where $N_T$ is 4.

Butler matrix 300 illustrated in FIG. 4 has four input ports Pi1 to Pi4, four output ports Po1 to Po4, four hybrids 301-1 to 301-4, two −45° fixed phase shifters 302-1 to 302-2 and two cross couplers 303-1 to 303-2.

According to this configuration, butler matrix 300 performs weighting using fixed phases different in accordance with the input ports. For example, when transmission signals are input from input port Pi1, signals having phase differences of −45°, −90°, −135° and −180° with respect to the transmission signals are respectively output from output ports Po1 to Po4. In a similar manner, when transmission signals are input from input port Pi2, signals having phase difference of −135°, 0°, −225° and −90° with respect to the transmission signals are respectively output from output ports Po1 to Po4.

Signals input from input port Pi1 and output from output ports Po1 to Po4 have a phase difference of −45° between adjacent output ports. Therefore, by the signals output from output ports Po1 to Po4 being transmitted from antenna ports corresponding to respective output ports, a beam directed to a direction of −45° is formed. In a similar manner, signals input from input port Pi2 and output from output ports Po1 to Po4 have a phase difference of 135° between adjacent output ports. Therefore, by signals output from output ports Po1 to Po4 being transmitted from antenna ports corresponding to respective output ports, a beam directed to a direction of 135° is formed.

In this manner, at butler matrix 300, as a result of fixed weights (phase adjustment weights) being provided to signals input from respective input ports, phase differences between adjacent output ports become fixed phase differences different in accordance with the input ports.

As a result of orthogonal beam fixed BF circuit 111 having a configuration of butler matrix 300, fixed weights different from each other is provided to signals input from respective input ports.

Figure 5:
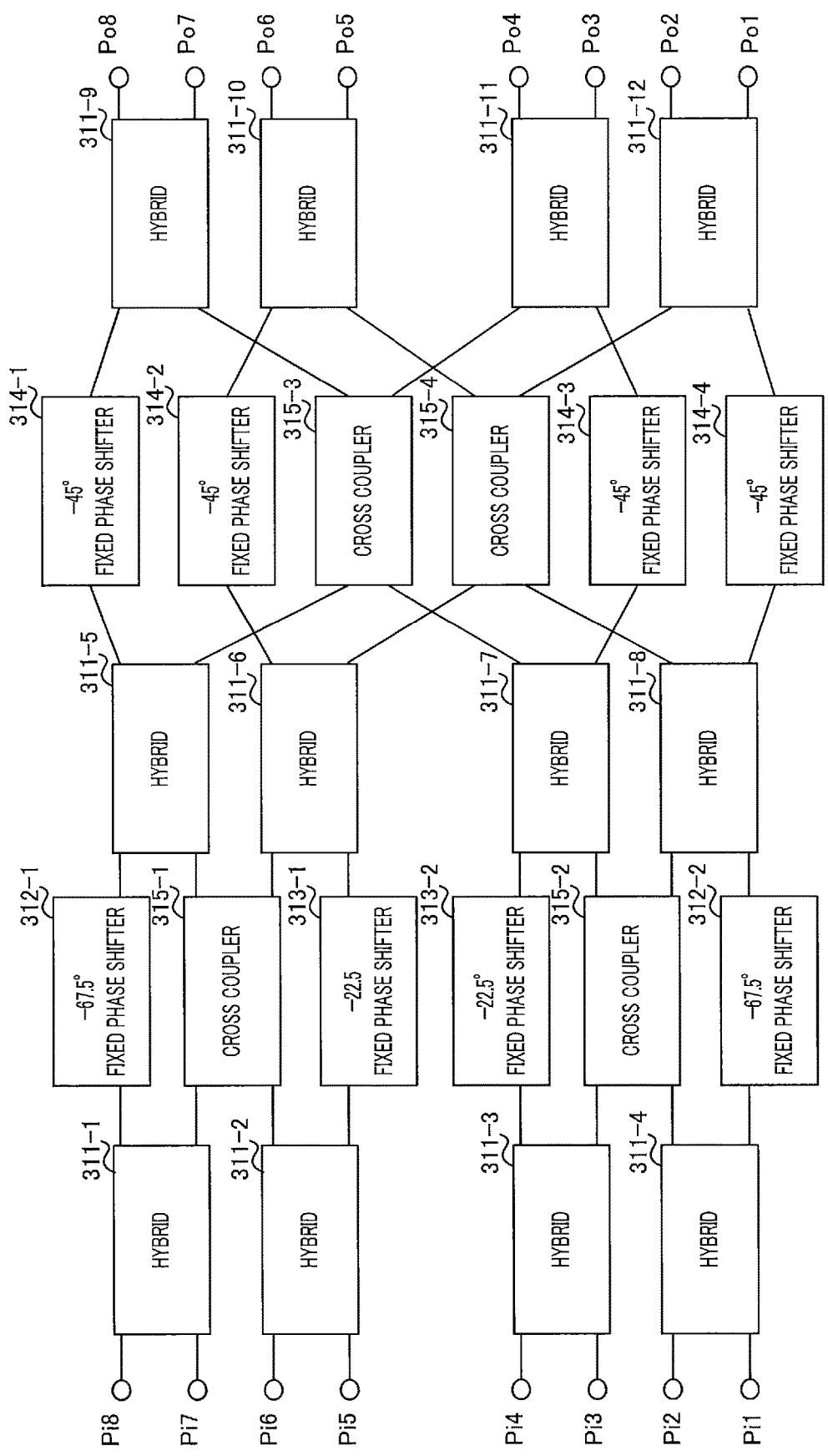
FIG. 5 illustrates an example of an 8×8 butler matrix.

FIG. 5 illustrates an example of butler matrix (8×8 butler matrix) 310. Orthogonal beam fixed BF circuit 111, for example, employs a configuration of butler matrix 310 in the case where $N_T$ is eight.

Butler matrix 310 illustrated in FIG. 5 includes eight input ports Pi1 to Pi8, eight output ports Po1 to Po8, hybrids 311-1 to 311-12, −67.5° fixed phase shifters 312-1 and 312-2, −22.5° fixed phase shifters 313-1 and 313-2, −45° fixed phase shifters 314-1 to 314-4 and cross couplers 315-1 to 315-4.

Because relationship between signals input to respective input ports and signals output from respective output ports is generally similar to that in FIG. 4, detailed description will be omitted. That is, at butler matrix 310, by fixed weights (phase adjustment weights) being provided to the signals input from respective input ports in a similar manner to the configuration of butler matrix 300 in FIG. 4, phase differences between adjacent output ports become fixed phase differences different in accordance with the input ports.

As a result of orthogonal beam fixed BF circuit 111 having a configuration of butler matrix 310, fixed weights different from each other are provided to the signals input from respective input ports.

Figure 6:
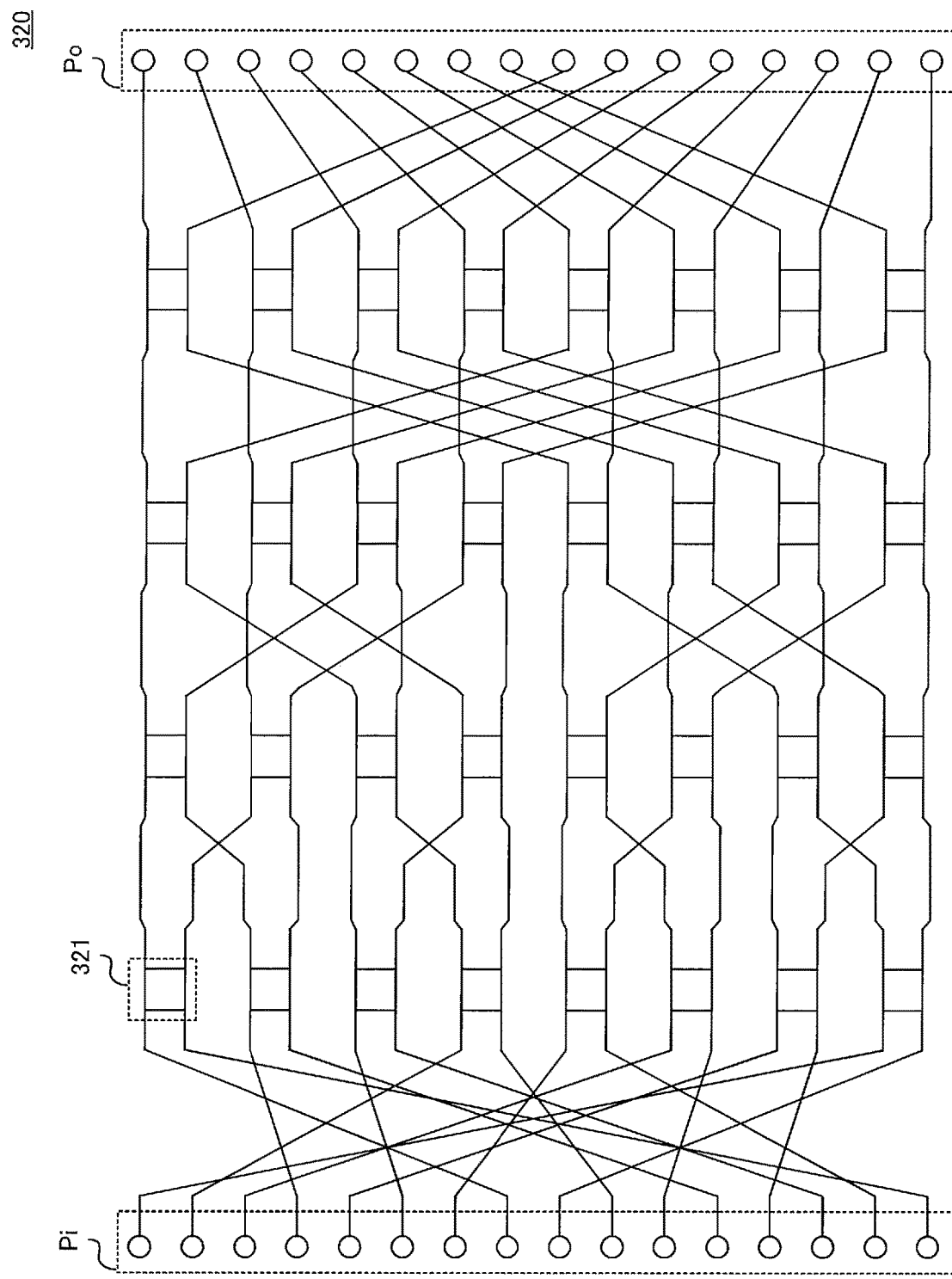
FIG. 6 illustrates a first example of a 16×16 butler matrix.
Figure 7:
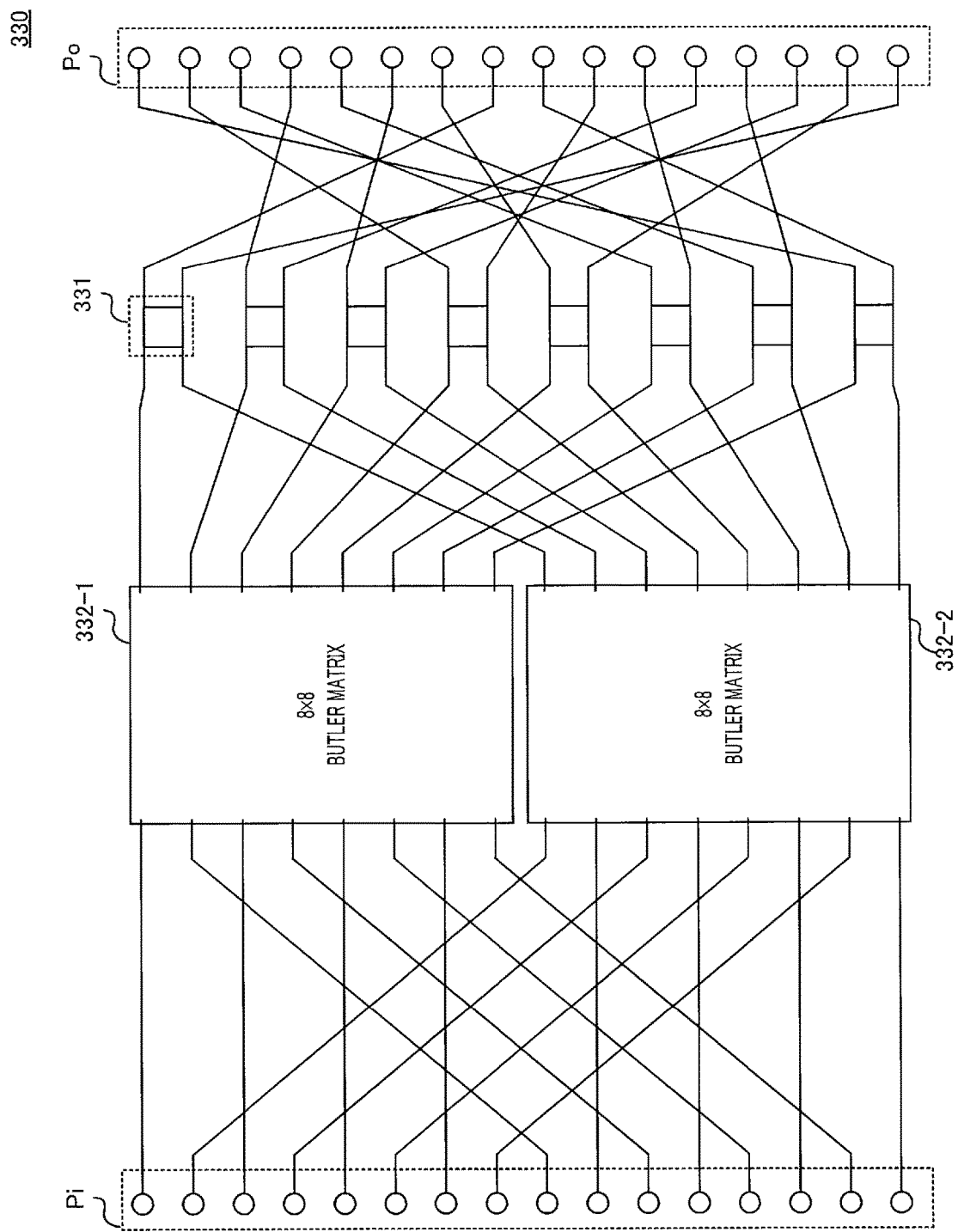
FIG. 7 illustrates a second example of the 16×16 butler matrix.
Figure 8:
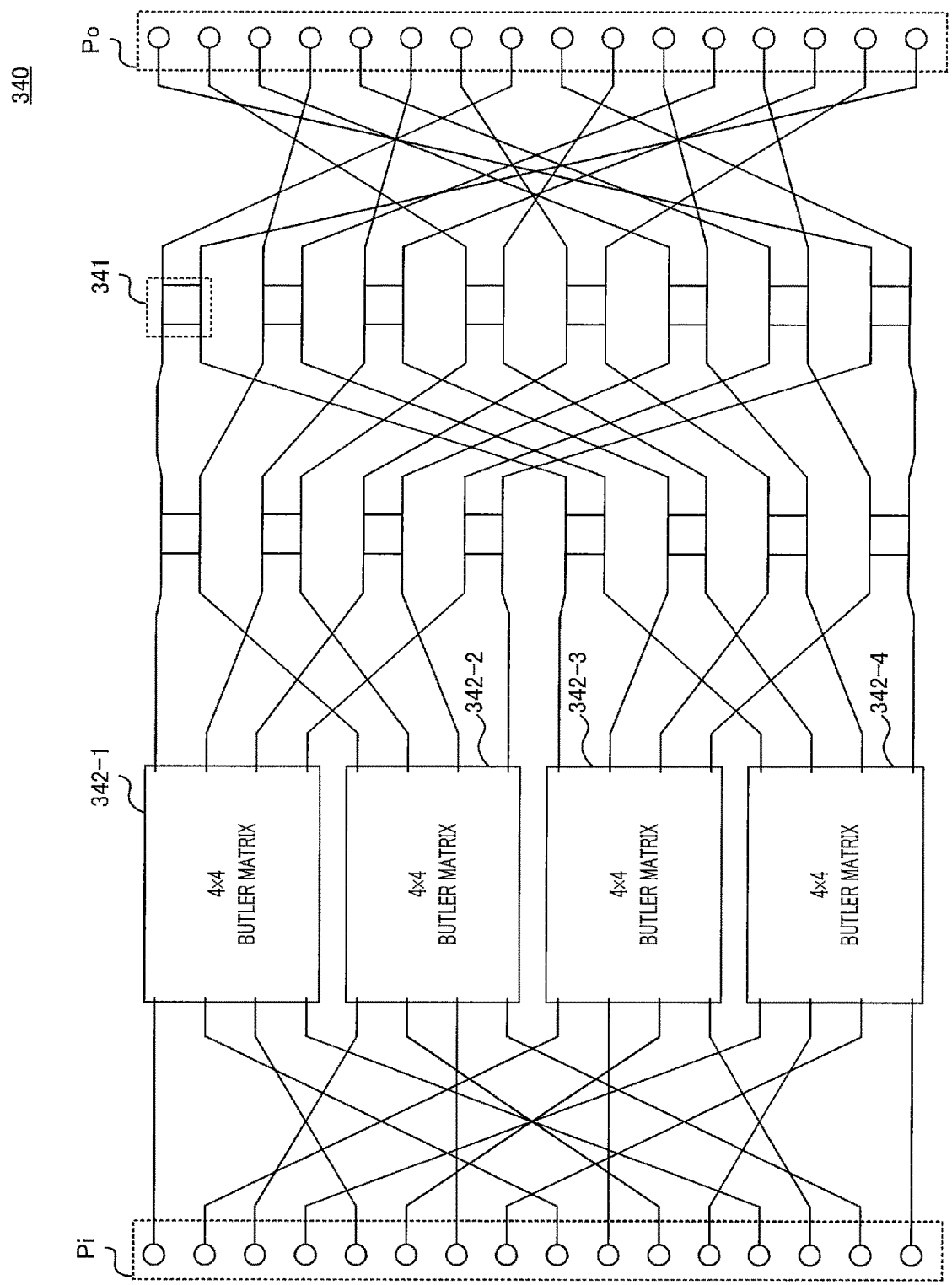
FIG. 8 illustrates a third example of the 16×16 butler matrix.

FIG. 6 illustrates a first example of butler matrix (16×16 butler matrix) 320. FIG. 7 illustrates a second example of butler matrix (16×16 butler matrix) 330. FIG. 8 illustrates a third example of butler matrix (16×16 butler matrix) 340. Orthogonal beam fixed BF circuit 111, for example, employs a configuration of one of butler matrixes 320, 330 and 340 in the case where $N_T$ is 16.

Butler matrix 320 illustrated in FIG. 6 is a 16×16 butler matrix with 16 input ports Pi, 16 output ports Po and a plurality of hybrids (for example, hybrids 321). Butler matrix 330 illustrated in FIG. 7 is a 16×16 butler matrix which is combination of 16 input ports Pi, 16 output ports Po, a plurality of hybrids (for example, hybrids 331) and 8×8 butler matrixes 332-1 and 332-2. Butler matrix 340 illustrated in FIG. 8 is a 16×16 butler matrix which is combination of 16 input ports Pi, 16 output ports Po, a plurality of hybrids (for example, hybrids 341) and 4×4 butler matrixes 342-1 to 342-4.

Because relationship between the signals input to respective input ports and the signals output from respective output ports is generally similar to that in FIG. 4, detailed description will be omitted. That is, at butler matrixes 320, 330 and 340, as a result of fixed weights (phase adjustment weights) being provided to the signals input from respective input ports in a similar manner to the configuration of butler matrix 300 in FIG. 4, phase differences between adjacent output ports become fixed phase differences different in accordance with the input ports.

As a result of orthogonal beam fixed BF circuit 111 having a configuration of one of butler matrixes 320, 330 and 340, fixed weights different from each other are provided to the signals input from respective input ports.

An example of orthogonal beam fixed BF circuit 111 using a configuration different from that of the butler matrix will be described next.

Figure 9:
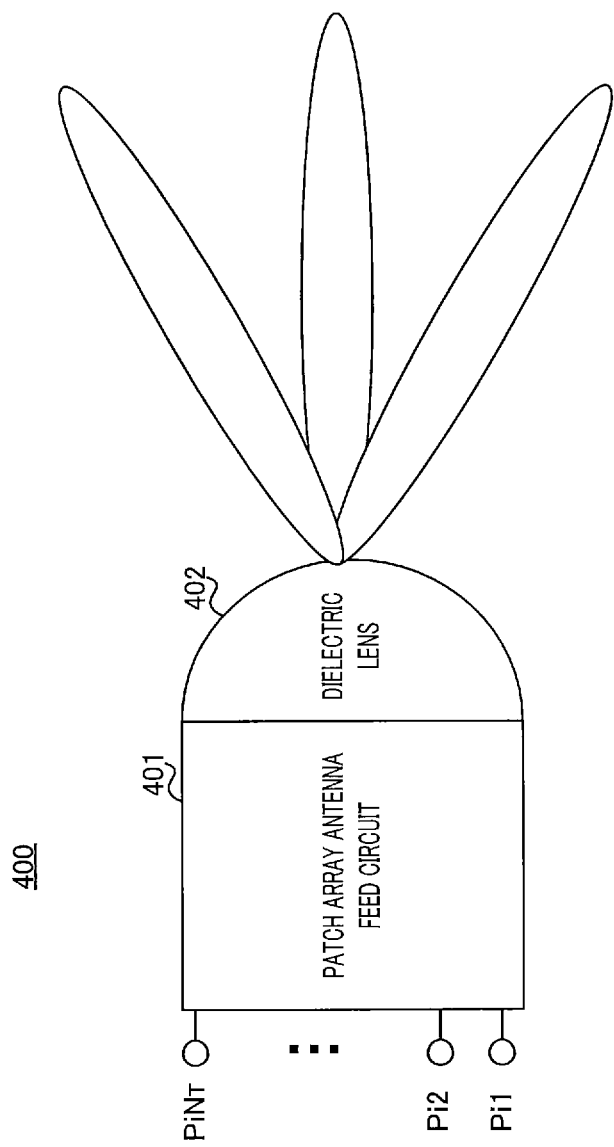
FIG. 9 illustrates an example of a configuration of an orthogonal beam fixed BF circuit.

FIG. 9 illustrates an example of a configuration of orthogonal beam fixed BF circuit 400. A configuration illustrated in FIG. 9 includes patch array antenna feed circuit 401 and dielectric lens 402. Note that the configuration illustrated in FIG. 9 corresponds to a configuration of orthogonal beam fixed BF circuit 111 and antenna ports 112-1 to 112-$N_T$ in FIG. 1.

Patch array antenna feed circuit 401 includes $N_T$ patch antenna elements respectively connected to $N_T$ input ports Pi1 to PiN$_T$. Patch array antenna feed circuit 401 outputs L transmission signals respectively to L patch antenna elements connected to L input ports corresponding to L output ports selected by high-speed switching circuit 110 among the $N_T$ patch antennas.

Dielectric lens 402 has a plurality of focuses which enable sharp beams to be oriented to a plurality of directions (different directions in an $N_T$ direction) at the same time. Dielectric lens 402 generates $N_T$ beams respectively corresponding to the $N_T$ patch antennas.

According to this configuration, L beams corresponding to the L output ports selected by high-speed switching circuit 110 are formed, and L transmission signals are transmitted using the L beams.

Note that, while the butler matrixes and a configuration of orthogonal beam fixed BF circuit 111 using the dielectric lens have been described above, the present invention is not limited to these. The orthogonal beam fixed BF circuit may, for example, employ a configuration using discrete Fourier transform. Further, the orthogonal beam fixed BF circuit may be configured with analog circuits or may be configured with digital circuits.

Effects of Embodiment 1

As described above, transmission apparatus 10 in Embodiment 1 includes signal conversion section 105 that converts each of signals of L sequences (where L is an integer equal to or greater than 2) into L transmission signals, orthogonal beam fixed beamforming circuit 111 that includes $N_T$ input ports (where $N_T$ is an integer equal to or greater than L) and that generates $N_T$ beams which correspond to respective input ports on a one-to-one basis and which are orthogonal to each other by providing fixed weights to signals input from the input ports, high-speed switching circuit 110 that is connected to input ports of orthogonal beam fixed beamforming circuit 111, selects L input ports from $N_T$ input ports of orthogonal beam fixed beamforming circuit 111 and respectively outputs the L transmission signals to the L input ports, and $N_T$ antenna ports that transmit signals output from orthogonal beam fixed beamforming circuit 111. Transmission apparatus 10 transmits the L transmission signals using L beams corresponding to the L input ports of orthogonal beam fixed beamforming circuit 111.

According to this configuration, because phases and/or amplitudes of weights to be provided to the transmission signals at orthogonal beam fixed BF circuit 111 can be fixed, a phase adjustment circuit that adjusts phases and/or an amplitude adjustment circuit that adjusts amplitudes to switch beams at high speed become unnecessary. Therefore, it is possible to switch beams at high speed without controlling adjustment of phases and adjustment of amplitudes at high speed.

Further, while it is difficult to implement a phase adjustment circuit and an amplitude adjustment circuit which can perform high-speed control in a high frequency band, in Embodiment 1, because a phase adjustment circuit and an amplitude adjustment circuit are unnecessary, it is possible to realize implementation in a high frequency band.

Further, according to the configuration of Embodiment 1, because a phase adjustment circuit and an amplitude adjustment circuit are unnecessary, it is possible to realize implementation at low cost.

For example, in the case where transmission apparatus 10 transmits initial discovery signals corresponding to the number of candidates for beams while switching combination of L beams, it is possible to execute transmission of the initial discovery signals at high speed while suppressing processing load.

Further, for example, in the case where a Massive MIMO base station having a configuration of transmission apparatus 10 performs communication in a time-division manner with a plurality of user terminals having a configuration of reception apparatus 20, it is possible to perform communication with each user terminal while switching optimal beams different for each user terminal at high speed.

Note that, while the transmission apparatus having analog BF circuit 109 has been described in Embodiment 1, the present invention is not limited to this. The reception apparatus may include an analog BF circuit. A reception apparatus having an analog BF circuit will be described below.

Figure 10:
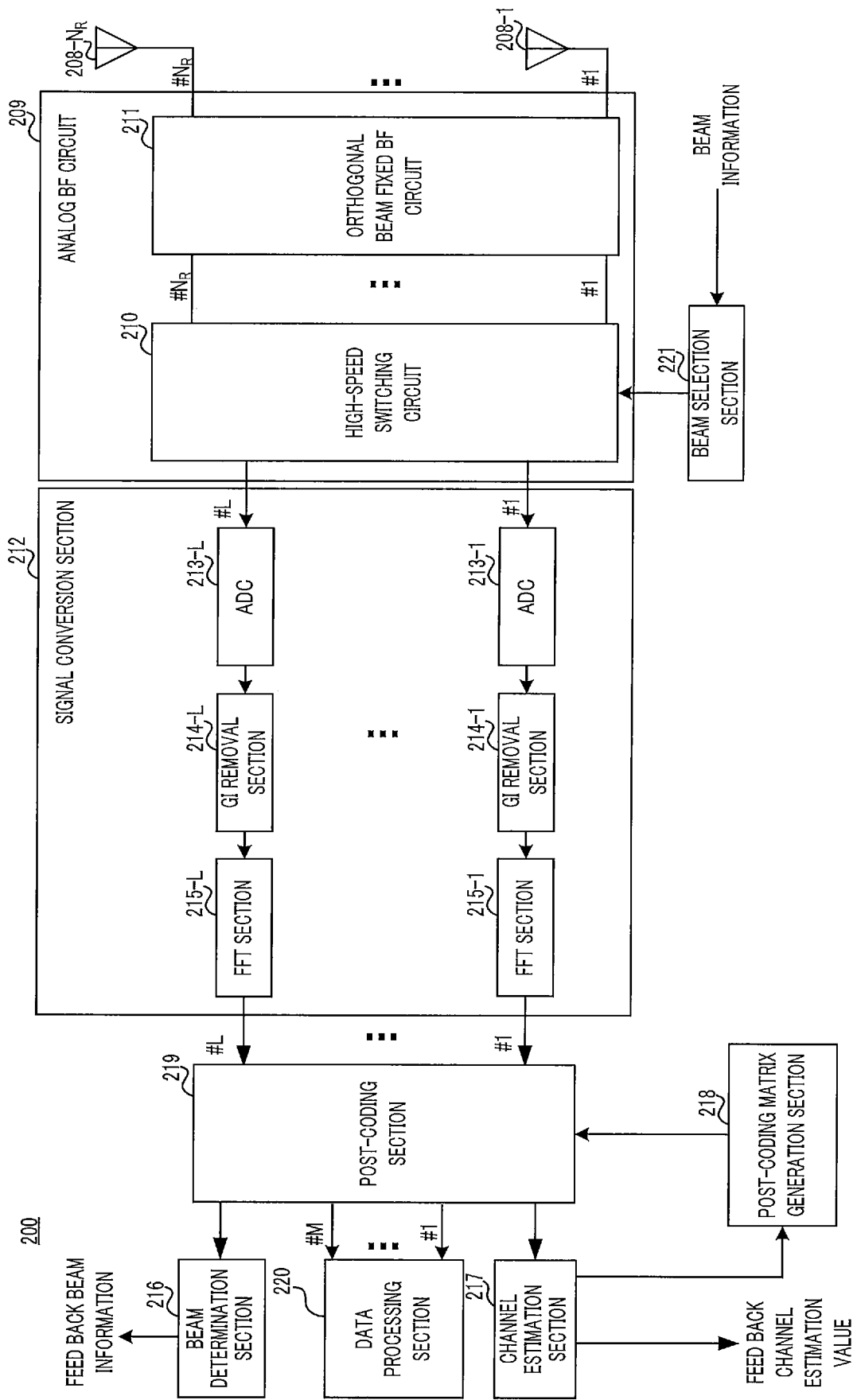
FIG. 10 is a block diagram illustrating another configuration example of the reception apparatus according to Embodiment 1.

FIG. 10 is a block diagram illustrating a configuration example of reception apparatus 200 according to Embodiment 1. Reception apparatus 200 illustrated in FIG. 10 includes antenna ports 208-1 to 208-$N_R$, analog BF circuit 209, signal conversion section 212, beam determination section 216, channel estimation section 217, post-coding matrix generation section 218, post-coding section 219, data processing section 220 and beam selection section 221.

Antenna ports 208-1 to 208-$N_R$ respectively receive signals. $N_R$ received signals received at $N_R$ antenna ports are output to analog BF circuit 209. While, in the above description, 208-1 to 208-$N_R$ are defined as antenna ports, antenna ports may be defined at output of analog BF circuit 209, for example, between analog BF circuit 209 and signal conversion section 212.

Analog BF circuit 209 provides weights for adjusting phases and/or amplitudes to receive L received signals using L beams which are orthogonal to each other.

Specifically, analog BF circuit 209 includes high-speed switching circuit 210 and orthogonal beam fixed BF (Beamforming) circuit 211. Analog BF circuit 209 is different from analog BF circuit 109 described above in that a direction of input/output is opposite.

High-speed switching circuit 210 includes L output ports and $N_R$ input ports. High-speed switching circuit 210 selects L input ports from $N_R$ input ports and acquires L received signals from the selected L input ports. Then, high-speed switching circuit 210 outputs the acquired L received signals to signal conversion section 212 respectively from L output ports.

In the case where the discovery signals are received, high-speed switching circuit 210 acquires each of L received signals (discovery signals) while changing combination of L input ports by switching selection of the L input ports at high speed. Further, in the case where the reference signals are received, high-speed switching circuit 210 selects L input ports corresponding to the beams selected by beam selection section 221 which will be described later and beams around the beams. Still further, in the case where the data signals are received, high-speed switching circuit 210 selects L input ports corresponding to the beams selected by beam selection section 221 which will be described later.

Orthogonal beam fixed BF circuit 211 includes $N_R$ output ports connected to the $N_R$ input ports of high-speed switching circuit 210 and $N_R$ input ports corresponding to $N_R$ antenna ports. Then, by orthogonal beam fixed BF circuit 211 providing fixed weights to signals input from the input ports (that is, signals output from reception antenna ports), $N_R$ beams (reception beams) respectively corresponding to the $N_R$ output ports are generated. The $N_R$ beams are orthogonal to each other.

Orthogonal beam fixed BF circuit 211 outputs L received signals from L output ports connected to the L input ports selected by high-speed switching circuit 210, among the $N_R$ output ports. Orthogonal beam fixed BF circuit 211 provides fixed weights to respective received signals respectively received by the $N_R$ antenna ports and outputs the weighted received signals to the L output ports.

Note that, because a configuration of orthogonal beam fixed BF circuit 211 is similar to the configuration of orthogonal beam fixed BF circuit 111 described above, description will be omitted.

Note that a communication section which is not illustrated may be provided between antenna ports 208-1 to 208-$N_R$ and orthogonal beam fixed BF circuit 211. The communication section may perform predetermined transmission processing such as frequency conversion of the received signals.

Signal conversion section 212 performs signal processing on each of the L received signals.

Specifically, signal conversion section 212 includes analog to digital converters (ADCs, hereinafter, referred to as "ADCs") 213-1 to 213-L, GI removal sections 214-1 to 214-L and FFT sections 215-1 to 215-L. Each of ADCs 213-1 to 213-L, GI removal sections 214-1 to 214-L and FFT sections 215-1 to 215-L is provided to each of the L received signals.

ADC 213-*i* (i is an integer between 1 and L) converts analog signals to be output from high-speed switching circuit 210 into digital signals.

Note that a frequency conversion section which is not illustrated may be provided before the ADC to down-convert the analog signals.

GI removal section 214-*i* removes GIs from the digital signals in a time domain output from ADC 213-*i*.

FFT section 215-*i* performs FFT (Fast Fourier Transform) processing on the digital signals from which the GIs are removed to generate an i-th symbol sequence (#i).

Signal conversion section 212 outputs L sequences subjected to the above-described each processing to post-coding section 219.

Beam determination section 216 calculates a CQI using the discovery signals input from post-coding section 219 which will be described later. The discovery signals are transmitted using L beams which are orthogonal to each other. Therefore, beam determination section 216 determines L beams with the highest CQI as candidates for beams on the basis of the CQI of the discovery signals transmitted using the L beams. A determination result indicating the determined candidates for beams is, for example, fed back to the transmission apparatus. Further, beam determination section 216 outputs the determination result to beam selection section 221.

Channel estimation section 217 estimates a channel estimation value (channel information) using the reference signals input from post-coding section 219 which will be described later. The estimated channel information is, for example, fed back to the transmission apparatus. Further, channel estimation section 217 outputs the estimated channel information to post-coding matrix generation section 218.

Post-coding matrix generation section 218 generates a post-coding matrix using the channel information input from channel estimation section 217. Post-coding matrix generation section 218 outputs the generated post-coding matrix to post-coding section 219.

Post-coding section 219 performs post-coding on the L sequences input from signal conversion section 212 using the post-coding matrix input from post-coding matrix generation section 218. Post-coding section 219 outputs data sequences subjected to post-coding to data processing section 220. Note that, in the case where the sequences output from signal conversion section 212 are sequences of the discovery signals and/or the reference signals, post-coding section 219 does not have to perform post-coding processing or may perform post-coding using a fixed post-coding matrix.

Data processing section 220 performs reception processing (including demodulation processing and decoding processing) on the data sequences input from post-coding section 219 to obtain a plurality of streams (streams #1 to #M).

Beam selection section 221 selects beams to be used for communication with the transmission apparatus on the basis of an index of beams which can be used for communication included in the beam information output from beam determination section 216.

According to this configuration, because phases and/or amplitudes of the weights to be provided to the received signals at orthogonal beam fixed BF circuit 211 can be made fixed, a phase adjustment circuit which adjusts phases and/or an amplitude adjustment circuit which adjusts amplitudes to switch beams at high speed become unnecessary. Therefore, it is possible to perform reception while switching beams at high speed without controlling adjustment of phases and adjustment of amplitudes at high speed.

Further, while it is difficult to implement a phase adjustment circuit and an amplitude adjustment circuit which can perform high-speed control in a high frequency band, in the above-described reception apparatus 200, because a phase adjustment circuit and an amplitude adjustment circuit are not necessary, it is possible to realize implementation in a high frequency band.

Further, because a phase adjustment circuit and an amplitude adjustment circuit are not necessary in the configuration of reception apparatus 200, it is possible to realize implementation at low cost.

For example, in the case where reception apparatus 200 receives initial discovery signals corresponding to the number of candidates for beams while switching combination of L beams, it is possible to execute reception of the initial discovery signals at high speed while suppressing processing load.

Further, for example, in the case where a Massive MIMO base station having the configuration of reception apparatus 200 performs communication with a plurality of user terminals in a time-division manner, it is possible to perform communication with each user terminal while switching optimal beams different for each user terminal at high speed.

Note that the base station and/or the user terminal may include both the configuration of transmission apparatus 10 and the configuration of reception apparatus 200. Further, for example, the base station and/or the user terminal may share an analog BF circuit and antenna ports and separately include a configuration which is connected to the analog BF circuit and which performs transmission processing on signals (for example, discovery signal generation section 101, reference signal generation section 102, transmission data generation section 103, pre-coding section 104 and signal conversion section 105 in FIG. 1), and a configuration which is connected to the analog BF circuit and which performs reception processing on signals (for example, signal conversion section 212, beam determination section 216, channel estimation section 217, post-coding matrix generation section 218, post-coding section 219, data processing section 220 and beam selection section 221 in FIG. 10).

Embodiment 2

In Embodiment 2, a transmission apparatus having an analog BF circuit which has a configuration different from that described in Embodiment 1 will be described.

Figure 11:
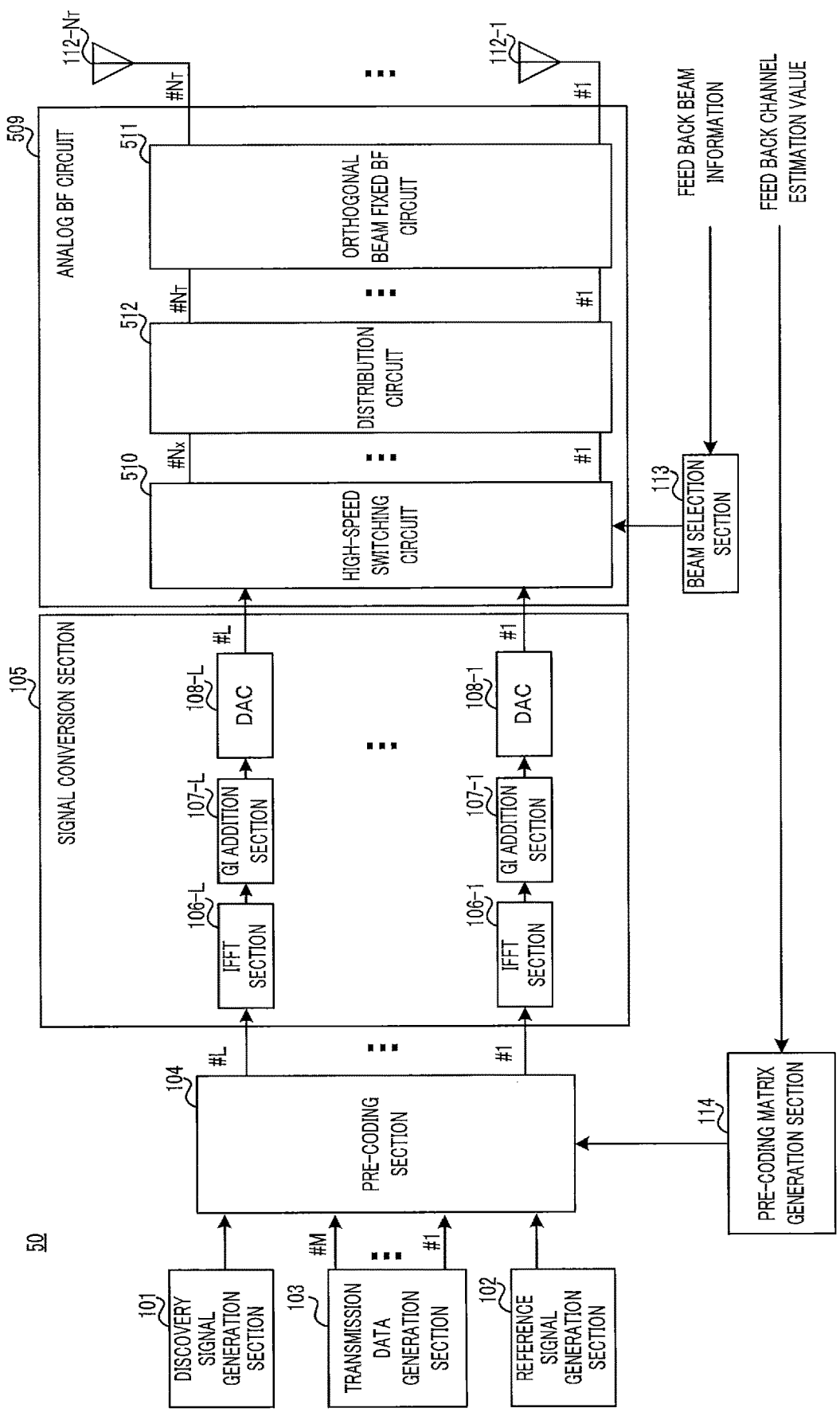
FIG. 11 is a block diagram illustrating a configuration example of a transmission apparatus according to Embodiment 2.

FIG. 11 is a block diagram illustrating a configuration example of transmission apparatus 50 according to Embodiment 2. In FIG. 11, the same reference numerals are assigned to components similar to those in FIG. 1, and detailed description will be omitted.

Transmission apparatus 50 is different from transmission apparatus 10 illustrated in FIG. 1 in that analog BF circuit 509 is provided in place of analog BF circuit 109.

Specifically, in analog BF circuit 509, distribution circuit 512 is provided between high-speed switching circuit 510 and orthogonal beam fixed BF circuit 511.

High-speed switching circuit 510 has L input ports and $N_X$ output ports (where $N_X$ is an integer equal to or greater than L and less than $N_T$). Then, to the L input ports, L transmission signals output from signal conversion section 105 are respectively input. High-speed switching circuit 510 selects L output ports from the $N_X$ output ports and outputs the L transmission signals respectively from the selected L output ports.

In the case where the discovery signals are transmitted, high-speed switching circuit 510 outputs each of L transmission signals (discovery signals) while changing combination of the L output ports by switching selection of the L output ports at high speed. Further, in the case where the reference signals are transmitted, high-speed switching circuit 510 selects L output ports corresponding to the beams selected by beam selection section 113 and beams around the beams. Still further, in the case where the data signals are transmitted, high-speed switching circuit 510 selects L output ports corresponding to the beams selected by beam selection section 113.

Distribution circuit 512 has $N_X$ input ports connected to the $N_X$ output ports of high-speed switching circuit 510 and $N_T$ output ports connected to $N_T$ input ports of orthogonal beam fixed BF circuit 511 which will be described later. Then, distribution circuit 512 branches signals input from $N_X$ input ports and outputs the signals from $N_T$ output ports. Output ports which are branched from and connected to one input port are output ports different from each other. That is, output ports which are branched and connected to one input port do not overlap with each other.

To distribution circuit 512, L discovery signals are input from L input ports during transmission of the discovery signals. Then, distribution circuit 512 generates Lo synthesized signals (where Lo is an integer equal to or greater than L and less than $N_T$) by branching L discovery signals and outputting the branched L discovery signals. Distribution circuit 512 then outputs the Lo signals from corresponding Lo output ports.

Orthogonal beam fixed BF circuit 511 has $N_T$ input ports connected to $N_T$ output ports of distribution circuit 512 and $N_T$ output ports corresponding to $N_T$ antenna ports. Orthogonal beam fixed BF circuit 511 then generates $N_T$ beams respectively corresponding to the $N_T$ input ports by providing fixed weights to signals input from the input ports. The $N_T$ beams are orthogonal to each other.

To orthogonal beam fixed BF circuit 511, Lo signals are input from Lo input ports among the $N_T$ input ports. Orthogonal beam fixed BF circuit 511 provides fixed weights respectively to the Lo signals and outputs the weighted transmission signals to the $N_T$ antenna ports.

Antenna ports 112-1 to 112-$N_T$ transmit the signals output from orthogonal beam fixed BF circuit 511. The Signals transmitted from the $N_T$ antenna ports form Lo beams which are orthogonal to each other. The Lo signals are transmitted respectively using the Lo beams.

Effects of Embodiment 2

As described above, transmission apparatus 50 according to Embodiment 2 includes distribution circuit 512 between high-speed switching circuit 510 and orthogonal beam fixed BF circuit 511. Distribution circuit 512 branches a plurality of discovery signals and outputs the branched discovery signals to orthogonal beam fixed BF circuit 511 during transmission of the discovery signals.

According to this configuration, it is possible to reduce overhead during transmission of the discovery signals, so that it is possible to reduce a time period for beam search time. For example, because L beams are selected from $N_T$ beams which are orthogonal to each other in one time of beam search, signal transmission for beam search corresponding to $N_T/L$ times is performed to determine L beams appropriate for transmission from $N_T$ beams. On the other hand, in Embodiment 2, as a result of distribution circuit 512 being inserted, it is possible to reduce beam search for determining L beams appropriate for communication from $N_T$ beams to $N_X/L$ times (where $N_X$ is an integer equal to or greater than L and less than $N_T$).

Alternatively, as a result of distribution circuit 512 being inserted, it is also possible to reduce overhead by performing beam search in a stepwise manner. For example, in beam search, it is possible to perform rough initial search using distribution circuit 512 first and then perform minute search in a direction determined in initial search.

Note that, while, in Embodiment 2, the transmission apparatus including analog BF circuit 509 has been described, the present invention is not limited to this. The reception apparatus may include an analog BF circuit corresponding to analog BF circuit 509. A reception apparatus including an analog BF circuit will be described below.

Figure 12:
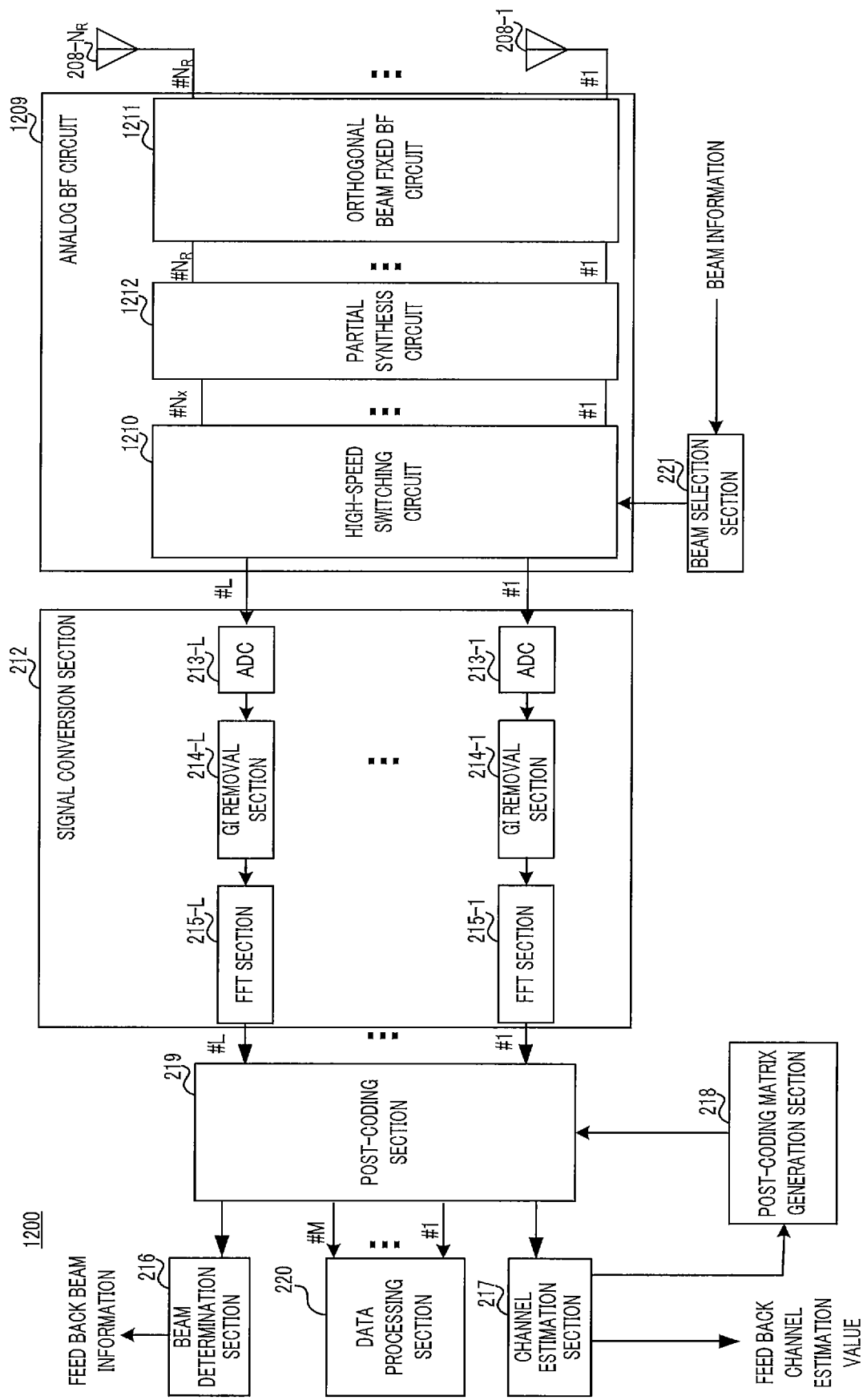
FIG. 12 is a block diagram illustrating a configuration example of a reception apparatus according to Embodiment 2.

FIG. 12 is a block diagram illustrating a configuration example of reception apparatus 1200 according to Embodiment 2. Note that, in FIG. 12, the same reference numerals are assigned to components similar to those in FIG. 10, and detailed description will be omitted.

Reception apparatus 1200 is different from reception apparatus 200 illustrated in FIG. 10 in that analog BF circuit 1209 is provided in place of analog BF circuit 209.

Specifically, in analog BF circuit 1209, partial synthesis circuit 1212 is provided between high-speed switching circuit 1210 and orthogonal beam fixed BF circuit 1211.

High-speed switching circuit 1210 includes L output ports and $N_X$ input ports. High-speed switching circuit 1210 selects L input ports from the $N_X$ input ports and acquires L received signals from the selected L input ports. High-speed switching circuit 1210 then outputs the acquired L received signals to signal conversion section 212 respectively from L output ports.

In the case where high-speed switching circuit 1210 receives the discovery signals, high-speed switching circuit 1210 acquires each of L received signals (discovery signals) while changing combination of the L input ports by switching selection of the L input ports at high speed.

Partial synthesis circuit 1212 includes $N_X$ output ports connected to $N_X$ input ports of high-speed switching circuit 1210 and $N_R$ input ports connected to $N_R$ output ports of orthogonal beam fixed BF circuit 1211 which will be described later. Partial synthesis circuit 1212 then groups and synthesizes signals input from the $N_R$ input ports and outputs synthesized signals from the $N_X$ output ports. The signal input from one input port is synthesized to be the signal to be output from one output port.

Orthogonal beam fixed BF circuit 1211 includes $N_R$ output ports connected to $N_R$ input ports of partial synthesis circuit 1212 and $N_R$ input ports corresponding to $N_R$ antenna ports. Orthogonal beam fixed BF circuit 1211 then generates $N_R$ beams (reception beams) respectively corresponding to the $N_R$ output ports by providing fixed weights to signals input from the input ports (that is, signals output from reception antenna ports). The $N_R$ beams are orthogonal to each other.

One signal output from partial synthesis circuit 1212 to high-speed switching circuit 1210 includes received signals received using a plurality of reception beams. As a result, L received signals acquired from the L input ports selected by high-speed switching circuit 1210 include signals received using L or more reception beams.

According to this configuration, it is possible to reduce overhead during transmission of the discovery signals, so that it is possible to reduce a time period for beam search. For example, because L beams are selected from $N_T$ beams which are orthogonal to each other in one time of beam search, signal reception for beam search corresponding to $N_T/L$ times is performed to determine L beams appropriate for communication from the $N_T$ beams. On the other hand, in Embodiment 2, as a result of partial synthesis circuit 1212 being inserted, it is possible to reduce beam search for determining L beams appropriate for communication from the $N_T$ beams to $N_X/L$ times (where $N_X$ is an integer equal to or greater than L and less than $N_T$).

Alternatively, as a result of partial synthesis circuit 1212 being inserted, it is also possible to reduce overhead by performing beam search in a stepwise manner. For example, in beam search, it is possible to perform rough initial search using partial synthesis circuit 1212 first, and, then, perform minute search in a direction determined in the initial search.

Embodiment 3

In Embodiment 3, a transmission apparatus having an analog BF circuit having a configuration different from that described in Embodiment 1 will be described.

Figure 13:
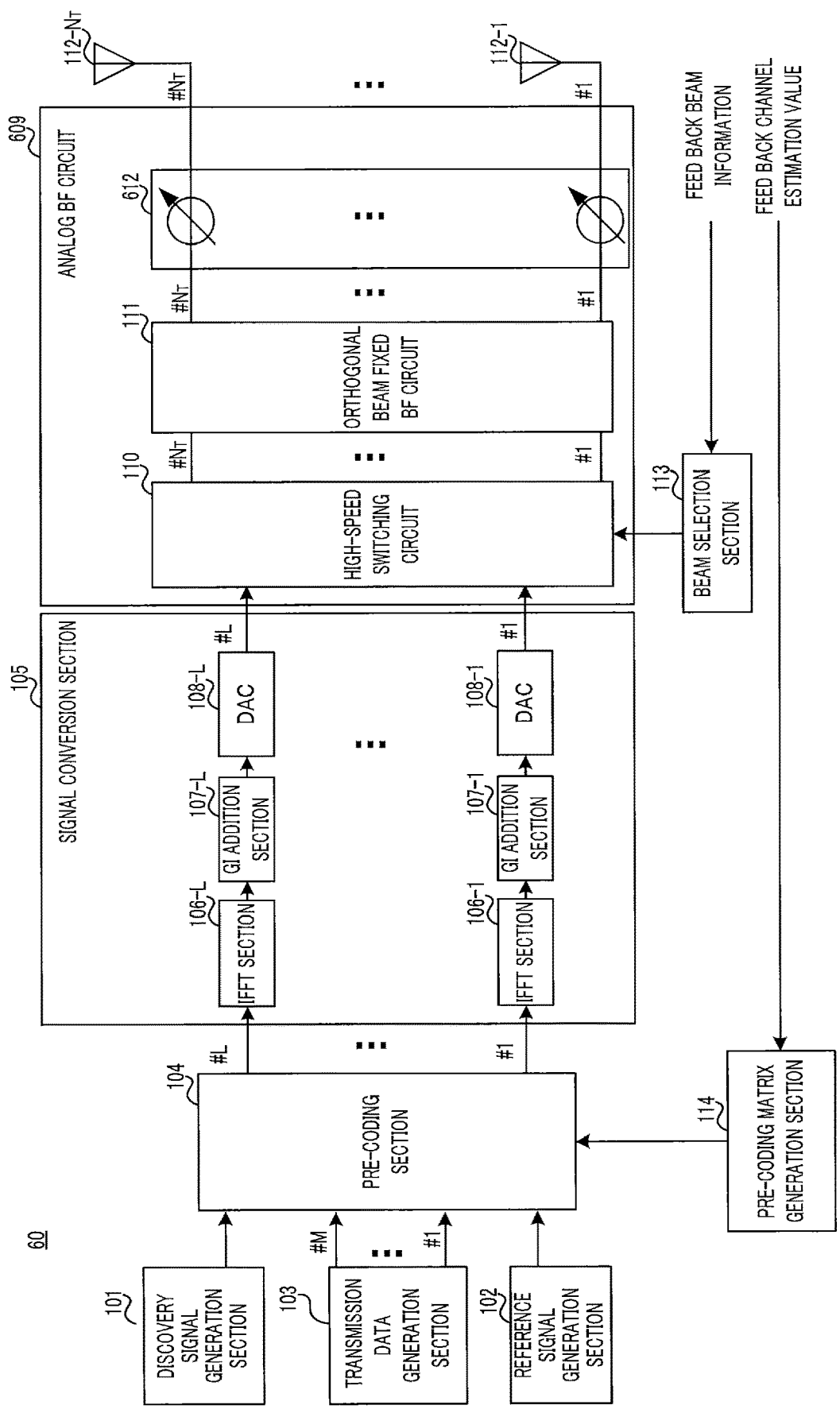
FIG. 13 is a block diagram illustrating a configuration example of a transmission apparatus according to Embodiment 3.

FIG. 13 is a block diagram illustrating a configuration example of transmission apparatus 60 according to Embodiment 3. Note that, in FIG. 13, the same reference numerals are assigned to components similar to those in FIG. 1, and detailed description will be omitted.

Transmission apparatus 60 is different from transmission apparatus 10 illustrated in FIG. 1 in that analog BF circuit 609 is provided in place of analog BF circuit 109.

Specifically, analog BF circuit 609 includes high-speed switching circuit 110, orthogonal beam fixed BF circuit 111 and high-speed analog phase adjustment circuit 612.

High-speed switching circuit 110 include L input ports and $N_T$ output ports. L transmission signals output from signal conversion section 105 are respectively input to the L input ports. High-speed switching circuit 110 selects L output ports from the $N_T$ output ports and outputs the L transmission signals respectively from the selected L output ports.

In the case where the discovery signals are transmitted, high-speed switching circuit 110 outputs the L transmission signals (discovery signals) while changing combination of the L output ports by switching selection of the L output ports at high speed. Further, in the case where the reference signals are transmitted, high-speed switching circuit 110 selects L output ports corresponding to the beams selected by beam selection section 113 and beams around the beams. Further, in the case where the data signals are transmitted, high-speed switching circuit 110 selects L output ports corresponding to the beams selected by beam selection section 113.

Orthogonal beam fixed BF circuit 111 includes $N_T$ input ports connected to $N_T$ output ports of high-speed switching circuit 110 and $N_T$ output ports connected to high-speed analog phase adjustment circuit 612. Then, orthogonal beam fixed BF circuit 111 generates $N_T$ beams respectively corresponding to the $N_T$ input ports by providing fixed weights to signals input from the input ports. The $N_T$ beams are orthogonal to each other.

To orthogonal beam fixed BF circuit 111, L transmission signals are input from L input ports connected to the L output ports selected by the high-speed switching circuit, among the $N_T$ input ports. Orthogonal beam fixed BF circuit 111 provides fixed weights to the L transmission signals and outputs the weighted transmission signals to high-speed analog phase adjustment circuit 612.

High-speed analog phase adjustment circuit 612 includes $N_T$ phase shifters connected to $N_T$ output ports of orthogonal beam fixed BF circuit 111. Then, high-speed analog phase adjustment circuit 612 adjusts phases so as to provide angle offsets to the L transmission signals output from orthogonal beam fixed BF circuit 111 in accordance with transmission timings. High-speed analog phase adjustment circuit 612 outputs the L transmission signals to which the angle offsets are provided to antenna ports 112-1 to 112-$N_T$.

Antenna ports 112-1 to 112-$N_T$ transmit signals output from high-speed analog phase adjustment circuit 612. The signals transmitted from the $N_T$ antenna ports form L beams which are orthogonal to each other. Then, the L transmission signals are transmitted respectively using the L beams.

Further, angle offsets are provided to the L beams in accordance with transmission timings.

Effects of Embodiment 3

As described above, transmission apparatus 60 according to Embodiment 3 includes high-speed analog phase adjustment circuit 612 which is provided between orthogonal beam fixed BF circuit 111 and antenna ports 112-1 to 112-$N_T$ and which provides angle offsets to input signals. According to this configuration, it is possible to transmit L transmission signals using L beams to which angle offsets are provided in a time-division manner in accordance with transmission timings.

Further, according to this configuration, because it is possible to reduce the number of phase shifters of high-speed analog phase adjustment circuit 612 to $N_T$, and an amplitude adjustment circuit is not necessary, it is possible to prevent a circuit scale from becoming large.

Further, while, in Embodiment 3, the transmission apparatus including analog BF circuit 609 has been described, the present invention is not limited to this. The reception apparatus may include analog BF circuit 609. For example, in reception apparatus 200 illustrated in FIG. 10, analog BF circuit 209 may be replaced with analog BF circuit 609 in FIG. 13.

Embodiment 4

Figure 14:
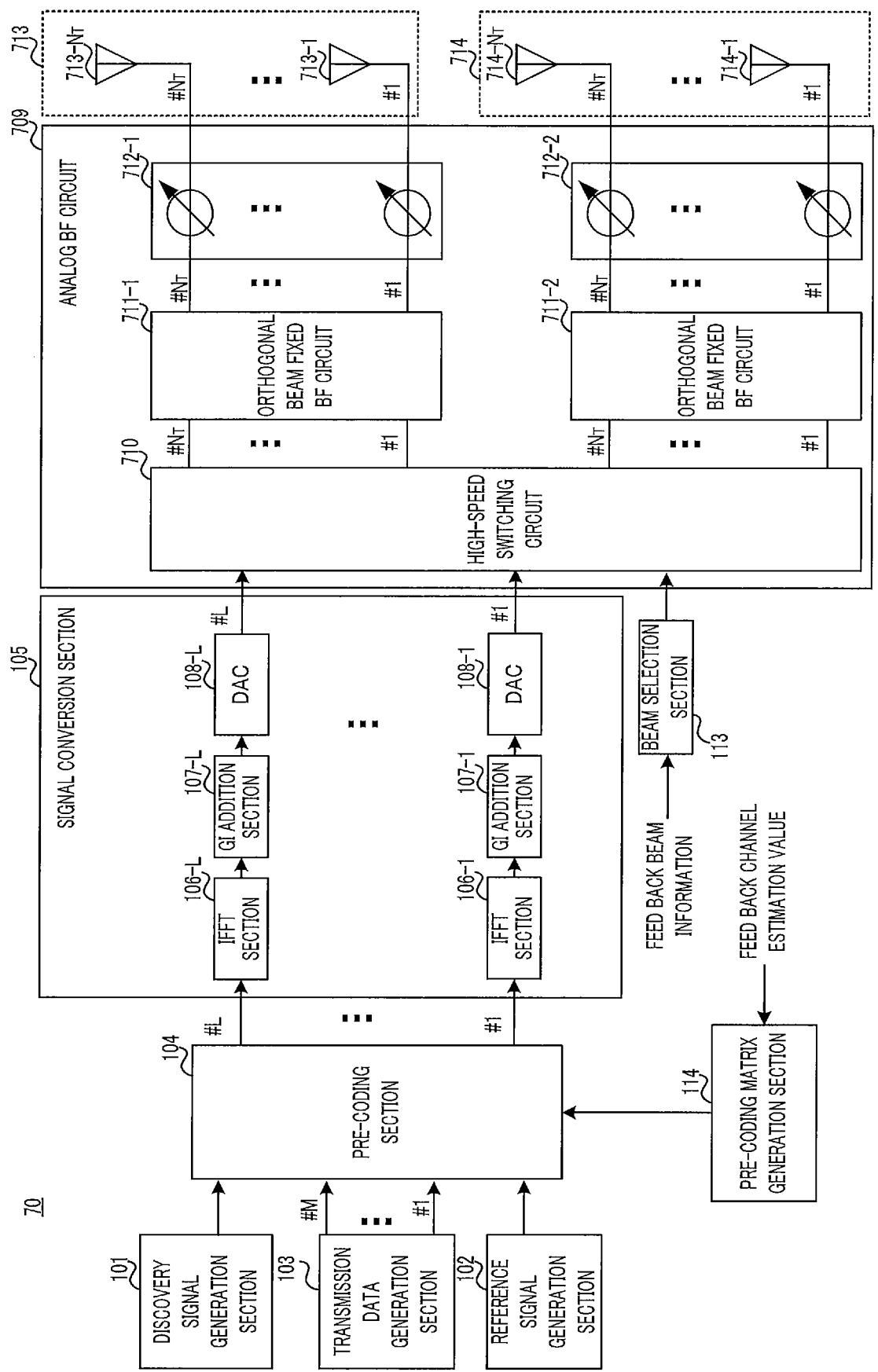
FIG. 14 is a block diagram illustrating a configuration example of a transmission apparatus according to Embodiment 4.

FIG. 14 is a block diagram illustrating a configuration example of transmission apparatus 70 according to Embodiment 4. Note that, in FIG. 14, the same reference numerals are assigned to components which are similar to those in FIG. 1, and detailed description will be omitted.

Transmission apparatus 70 is different from transmission apparatus 10 illustrated in FIG. 1 in that analog BF circuit 709 is provided in place of analog BF circuit 109, and two sets of $N_T$ antenna ports (antenna port group 713 and antenna port group 714) are provided in place of $N_T$ antenna ports 112-1 to 112-$N_T$.

Analog BF circuit 709 includes high-speed switching circuit 710, two orthogonal beam fixed BF circuits 711 (711-1 and 711-2) and two high-speed analog phase adjustment circuits 712 (712-1 and 712-2). Analog BF circuit 709 is connected to antenna port group 713 and antenna port group 714. Antenna port group 713 includes $N_T$ antenna ports 713-1 to 713-$N_T$, and antenna port group 714 includes $N_T$ antenna ports 714-1 to 714-$N_T$. While, in the above description, 713-1 to 713-$N_T$ and 714-1 to 714-$N_T$ have been defined as antenna ports, antenna ports may be defined at output of signal conversion section 105, for example, between analog BF circuit 709 and signal conversion section 105.

High-speed switching circuit 710 includes L input ports and 2$N_T$ output ports. To the L input ports, L transmission signals output from signal conversion section 105 are respectively input. High-speed switching circuit 710 selects L output ports from 2$N_T$ output ports and outputs the L transmission signals respectively from the selected L output ports.

In the case where the discovery signals are transmitted, high-speed switching circuit 710 outputs L transmission signals (discovery signals) while changing combination of the L output ports by switching selection of the L output ports at high speed. Further, in the case where the reference signals are transmitted, high-speed switching circuit 710 selects L output ports corresponding to the beams selected by beam selection section 113 and beams around the beams. Further, in the case where the data signals are transmitted, high-speed switching circuit 710 selects L output ports corresponding to the beams selected by beam selection section 113.

Orthogonal beam fixed BF circuit 711-1 includes $N_T$ input ports connected to $N_T$ output ports among the 2$N_T$ output ports of high-speed switching circuit 110 and $N_T$ output ports connected to high-speed analog phase adjustment circuit 712-1. Orthogonal beam fixed BF circuit 711-1 generates $N_T$ beams respectively corresponding to the $N_T$ input ports by providing fixed weights to signals input from the input ports. The $N_T$ beams are orthogonal to each other.

To orthogonal beam fixed BF circuit 711-1, L1 transmission signals are input from L1 input ports connected to L1 output ports (where L1 is an integer between 0 and L) selected by high-speed switching circuit 710, among $N_T$ input ports. Orthogonal beam fixed BF circuit 711-1 provides fixed weights to the L1 transmission signals and outputs the weighted transmission signals to high-speed analog phase adjustment circuit 712-1.

Orthogonal beam fixed BF circuit 711-2 includes $N_T$ input ports connected to $N_T$ output ports which are not connected to orthogonal beam fixed BF circuit 711-1 among the 2$N_T$ output ports of high-speed switching circuit 710 and $N_T$ output ports connected to high-speed analog phase adjustment circuit 712-2. Orthogonal beam fixed BF circuit 711-2 generates $N_T$ beams respectively corresponding to the $N_T$ input ports by providing fixed weights to signals input from the input ports. The $N_T$ beams are orthogonal to each other.

To orthogonal beam fixed BF circuit 711-2, L2 transmission signals are input from L2 input ports connected to L2 output ports (where L2 is an integer between 0 and L) selected by high-speed switching circuit 710, among the $N_T$ input ports. Orthogonal beam fixed BF circuit 711-1 provides fixed weights to the L2 transmission signals and outputs the weighted transmission signals to high-speed analog phase adjustment circuit 712-2.

High-speed analog phase adjustment circuit 712-1 includes $N_T$ phase shifters connected to the $N_T$ output ports of orthogonal beam fixed BF circuit 711-1. High-speed analog phase adjustment circuit 712-1 adjusts phases so as to provide angle offsets to the L1 transmission signals output from orthogonal beam fixed BF circuit 711-1. High-speed analog phase adjustment circuit 712-1 outputs the L1 transmission signals to which the angle offsets are provided to antenna ports 713-1 to 713-$N_T$.

High-speed analog phase adjustment circuit 712-2 includes $N_T$ phase shifters connected to the $N_T$ output ports of orthogonal beam fixed BF circuit 711-2. High-speed analog phase adjustment circuit 712-2 adjusts phases so as to provide angle offsets to the L2 transmission signals output from orthogonal beam fixed BF circuit 711-2. High-speed analog phase adjustment circuit 712-2 outputs the L2 transmission signals to which the angle offsets are provided to antenna ports 714-1 to 714-$N_T$.

A magnitude of the angle offset (first angle offset) provided by high-speed analog phase adjustment circuit 712-1 is different from a magnitude of the angle offset (second angle offset) provided by high-speed analog phase adjustment circuit 712-2. For example, a different between the first angle offset and the second angle offset is 1/$N_T$ of an angle difference between adjacent beams of $N_T$ beams.

Antenna ports 713-1 to 713-$N_T$ transmit the signals output from high-speed analog phase adjustment circuit 712-1. The signals transmitted from antenna ports 713-1 to 713-$N_T$ form L1 beams which are orthogonal to each other. L1 transmission signals are transmitted respectively using the L1 beams. Further, the first angle offsets are provided to the L1 beams.

Antenna ports 714-1 to 714-$N_T$ transmit the signals output from high-speed analog phase adjustment circuit 712-2. The signals transmitted from antenna ports 714-1 to 714-$N_T$ form L2 beams which are orthogonal to each other. L2 transmission signals are transmitted respectively using the L2 beams. Further, the second angle offsets are provided to the L2 beams.

Figure 15:
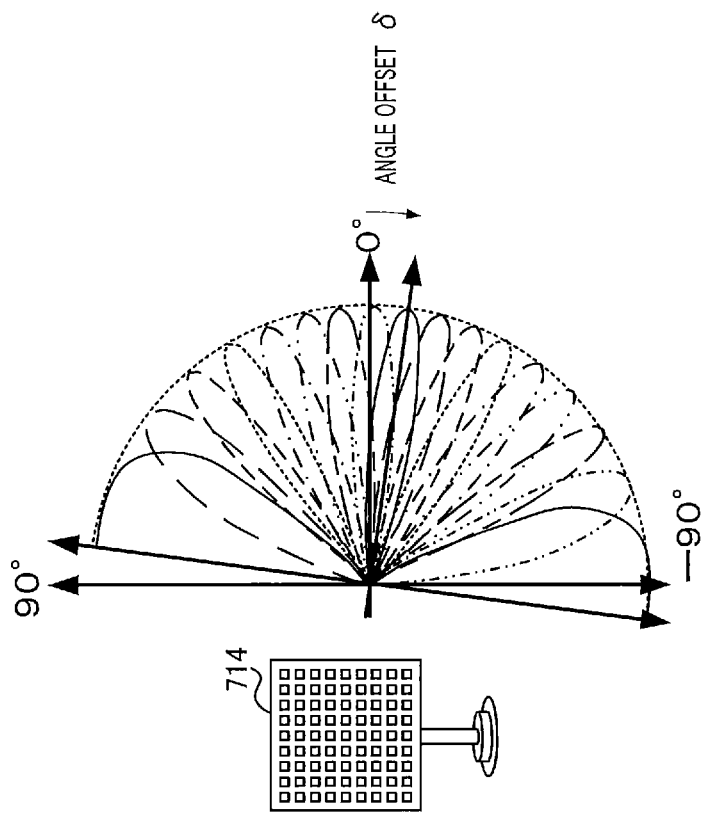
FIG. 15 illustrates an example of beams fanned by two antenna port groups.
Figure 15:
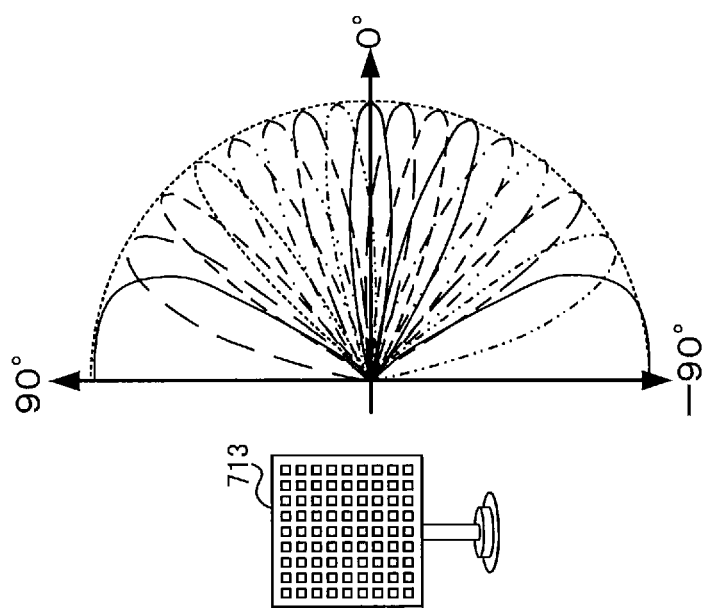

FIG. 15 illustrates an example of beams formed by the two antenna port groups. FIG. 15 illustrates $N_T$ beams formed by antenna port group 713 and $N_T$ beams formed by antenna port group 714 which is adjacent to antenna port group 713.

As illustrated in FIG. 15, different angle offsets δ are provided between the beams formed by antenna port group 713 and the beams formed by antenna port group 714.

Effects of Embodiment 4

As described above, transmission apparatus 70 according to Embodiment 4 includes orthogonal beam fixed BF circuit 711-1, high-speed analog phase adjustment circuit 712-1 connected to orthogonal beam fixed BF circuit 711-1, antenna port group 713 which transmits signals output from high-speed analog phase adjustment circuit 712-1, orthogonal beam fixed BF circuit 711-2, high-speed analog phase adjustment circuit 712-2 connected to orthogonal beam fixed BF circuit 711-2, and antenna port group 714 which transmits signals output from high-speed analog phase adjustment circuit 712-2. High-speed analog phase adjustment circuit 712-1 and high-speed analog phase adjustment circuit 712-2 provide angle offsets different from each other to the signals input to high-speed analog phase adjustment circuit 712-1 and high-speed analog phase adjustment circuit 712-2. According to this configuration, because different angle offsets are provided between the beams formed by antenna port group 713 and the beams foamed by antenna port group 714, it is possible to lower correlation between the beams.

Further, in this configuration, because magnitudes of the angle offsets at high-speed analog phase adjustment circuits 712-1 and 712-2 may be fixed, high-speed phase adjustment is not required.

Note that physical antenna arrangement including intervals between physical antenna elements corresponding to antenna ports 713-1 to 713-$N_T$, or the like, may be different from physical antenna arrangement including intervals between physical antenna elements corresponding to antenna ports 714-1 to 714-$N_T$, or the like. As a result of antenna arrangements which are different from each other being provided, it is possible to further lower correlation between the beams formed by antenna port group 713 and the beams formed by antenna port group 714.

Further, while, in Embodiment 4, a configuration including two antenna port groups, two orthogonal beam fixed BF circuits respectively connected to the two antenna port groups, and two high-speed analog phase adjustment circuits has been described, the present invention is not limited to this. For example, it is also possible to employ a configuration including M antenna port groups (where M is an integer equal to or greater than 3), M orthogonal beam fixed BF circuits respectively connected to the M antenna port groups, and M high-speed analog phase adjustment circuits.

In the case where M antenna port groups are provided, a difference in angle offsets between beams respectively formed by the M antenna ports may be made 1/M of an angle difference between adjacent beams of $N_T$ beams by each high-speed analog phase adjustment circuit adjusting angle offsets.

Note that, while, in Embodiment 4, an example where the number of antenna ports is the same between the two antenna port groups has been described, the present invention is not limited to this. The number of antenna ports and/or the number of beams to be formed may be different between the two antenna port groups.

Further, while, in Embodiment 4, the transmission apparatus including analog BF circuit 709 and a plurality of antenna port groups (antenna port groups 713 and 714) has been described, the present invention is not limited to this. The reception apparatus may include analog BF circuit 709 and a plurality of antenna port groups. For example, in reception apparatus 200 illustrated in FIG. 10, analog BF circuit 209 may be replaced with analog BF circuit 709 in FIG. 14, and, further, reception apparatus 200 may include two or more antenna ports.

Each embodiment has been described above.

Note that the number of input/output ports in the analog BF circuit described in the above-described each embodiment (for example, L, $N_T$, $N_R$ and $N_X$) may be fixed or may be variable. For example, at the analog BF circuit, processing such as decimation may be performed at the input side and/or the output side. Further, while an example has been described where the analog BF circuit in the above-described each embodiment employs a configuration of an analog circuit, the present invention is not limited to this, and the beamforming circuit may employ a configuration of a digital circuit.

Further, while, in the above-described each embodiment, an example has been described where antenna ports are provided between the physical antennas and the analog BF circuits, the present invention is not limited to this. For example, antenna ports may be provided between signal conversion sections (for example, signal conversion sections 105 and 212) and the analog BF circuits (for example, analog BF circuits 109, 209, 509, 609, 709 and 1209).

Further, mapping from the antenna ports to the physical antennas is arbitrary, and mapping includes all conditions that the antenna ports are made to correspond to the physical antennas on a one-to-one basis, each antenna port is connected to a plurality of physical antennas, and the antenna ports are made to correspond to beams.

Further, while, in the above-described each embodiment, an example where the transmission apparatus is a base station has been described, the user terminal may employ a configuration of the transmission apparatus. Alternatively, both the base station and the user terminal may have the configuration of the transmission apparatus described in each embodiment.

In the case where both the base station and the user terminal have the configuration of the transmission apparatus described in each embodiment, because it is possible to switch beams at high speed at both the base station and the user terminal, it is possible to transmit the discovery signals (and/or the reference signals) while switching beams in a round-robin manner and select optimal beams for each other.

Further, both the base station and the user terminal may have the configuration of the reception apparatus described in each embodiment. Still further, while, in the above-described each embodiment, a configuration of one of the transmission apparatus and the reception apparatus has been described, for example, the base station and/or the user terminal may be a transmission and reception apparatus having both the transmission apparatus and the reception apparatus described in each embodiment.

For example, the transmission and reception apparatus is a transmission and reception apparatus which includes a plurality of antenna ports, and includes an orthogonal beam fixed BF circuit and a high-speed switching circuit between a transmission and reception circuit (for example, signal conversion section 105 and/or signal conversion section 212) and the antenna ports.

For example, the transmission and reception circuit outputs a transmission signal subjected to transmission signal processing to the high-speed switching circuit during signal transmission, the high-speed switching circuit selects at least one port from a plurality of ports provided at the orthogonal beamforming circuit and outputs the transmission signal to the selected port, and the orthogonal beamforming circuit forms a beam corresponding to the selected port to transmit the transmission signal. Further, for example, the transmission and reception circuit performs reception signal processing on a received signal output from the high-speed switching circuit during signal reception, the high-speed switching circuit selects at least one port from the plurality of ports provided at the orthogonal beamforming circuit, and acquires the received signal from the selected port, and the orthogonal beamforming circuit forms a beam corresponding to the selected port and receives the received signal.

Further, in the above-described each embodiment, it is also possible to first limit beams (candidates for beams) to be used for transmission of signals and transmit the discovery signals using the limited candidates for beams. Then, the user terminal may receive the discovery signals and, after the user terminal is connected to the base station, search optimal beams again using all the candidates for beams. For example, it is also possible to limit candidates for beams to only a front direction of the base station or limit the candidates for beams to only a direction of a specific area. By this means, it is possible to reduce interference with adjacent base stations.

Further, a macro base station (for example, an aggregate station which manages a plurality of base stations) which manages base stations (Massive MIMO stations) each having the transmission apparatus described in each embodiment may aggregate information relating to handover of user terminals, make a database of the information and assist handover between a plurality of Massive MIMO stations on the basis of the database.

(Hardware Configuration)

Note that the block diagrams used to describe the embodiments illustrate blocks on the basis of functions. These functional blocks (constituent sections) are implemented by any combination of hardware and/or software. A means for realizing the functional blocks is not particularly limited. That is, the functional blocks may be implemented by one physically and/or logically coupled apparatus. Two or more physically and/or logically separated apparatuses may be directly and/or indirectly (for example, wired and/or wireless) connected, and the plurality of apparatuses may implement the functional blocks.

Figure 16:
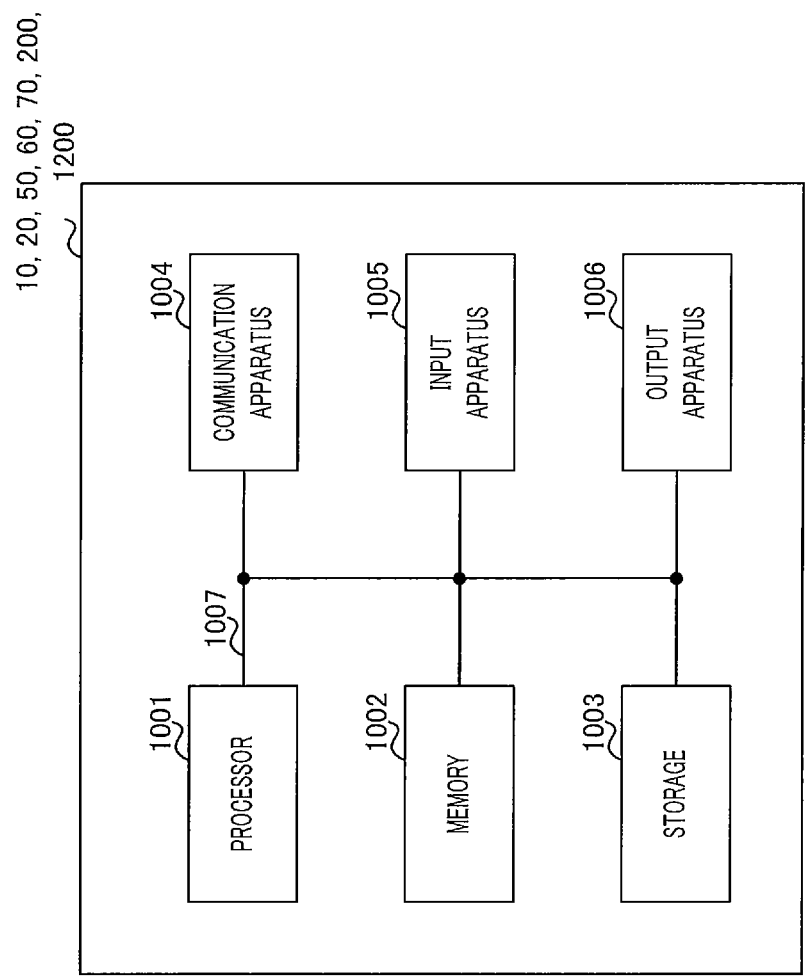
FIG. 16 illustrates an example of a hardware configuration of a transmission apparatus and a reception apparatus according to the present embodiment.

For example, the radio base station, the user terminal, the transmission apparatus, the reception apparatus, or the like, according to an embodiment of the present invention may function as computers which perform processing of the radio communication method of the present invention. FIG. 16 illustrates an example of hardware configurations of the transmission apparatus and the reception apparatus according to an embodiment of the present invention. The above-described transmission apparatuses 10, 50, 60 and 70 and reception apparatuses 20, 200 and 1200 may be physically configured as a computer apparatus including processor 1001, memory 1002, storage 1003, communication apparatus 1004, input apparatus 1005, output apparatus 1006, bus 1007, or the like.

Note that the term "apparatus" in the following description can be replaced with a circuit, a device, a unit, or the like. The hardware configurations of transmission apparatuses 10, 50, 60, and 70 and reception apparatuses 20, 200 and 1200 may include one or a plurality of apparatuses illustrated in the drawings or may not include part of the apparatuses.

For example, although only one processor 1001 is illustrated, there may be a plurality of processors. The processing may be executed by one processor, or the processing may be executed by one or more processors at the same time, in succession, or in another manner. Note that processor 1001 may be implemented by one or more chips.

The functions in the transmission apparatus 10, 50, 60 and 70 and the reception apparatus 20, 200 and 1200 are implemented by predetermined software (program) loaded into hardware, such as processor 1001, memory 1002, and the like, according to which processor 1001 performs the arithmetic and controls communication performed by communication apparatus 1004 or reading and/or writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, or the like. For example, discovery signal generation section 101, reference signal generation section 102, transmission data generation section 103, pre-coding section 104, signal conversion sections 105 and 212, analog BF circuits 109, 209, 509, 609, 709 and 1209, high-speed switching circuits 110, 210, 510, 710 and 1210, orthogonal beam fixed BF circuits 111, 211, 400, 511, 711-1, 711-2 and 1211, beam selection sections 113 and 221, pre-coding matrix generation section 114, beam determination sections 203 and 206, channel estimation sections 204 and 217, post-coding matrix generation sections 205 and 218, post-coding sections 206 and 219, data processing sections 207 and 220, distribution circuit 512, partial synthesis circuit 1212, high-speed analog phase adjustment circuits 612, 712-1 and 712-2, or the like, as described above may be implemented by processor 1001.

Processor 1001 reads out a program (program code), a software module, or data from storage 1003 and/or communication apparatus 1004 to memory 1002 and executes various types of processing according to the read-out program or the like. The program used is a program for causing the computer to execute at least part of the operation described in the embodiments. For example, at least part of functional blocks constituting transmission apparatuses 10, 50, 60 and 70 and reception apparatuses 20, 200 and 1200 may be implemented by a control program stored in memory 1002 and operated by processor 1001, and the other functional blocks may also be implemented in the same way. While it has been described that the various types of processing as described above are executed by one processor 1001, the various types of processing may be executed by two or more processors 1001 at the same time or in succession. Processor 1001 may be implemented by one or more chips. Note that the program may be transmitted from a network through a telecommunication line.

Memory 1002 is a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), or the like. Memory 1002 can save a program (program code), a software module, and the like that can be executed to carry out the radio communication method according to an embodiment of the present invention.

Storage 1003 is a computer-readable recording medium and may be composed of, for example, at least one of an optical disk such as a CD-ROM (Compact Disc ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. Storage 1003 may also be called an auxiliary storage apparatus. The storage medium as described above may be a database, server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module. For example, communication sections 202-1 to 202-$N_R$, antenna ports 112-1 to 112-$N_T$, 201-1 to 201-$N_R$, 208-1 to 208-$N_R$, 713-1 to 713-$N_T$, 714-1 to 714-$N_T$, or the like, as described above may be implemented by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which outputs to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be composed of a single bus or by buses different among the apparatuses.

Furthermore, the transmission apparatus 10, 50, 60 and 70 and the reception apparatus 20, 200 and 1200 may include hardware, such as a microprocessor, a digital signal processor (DSP), an ASIC (Application Specific Integrated Circuit), a PLD (Programmable Logic Device), and an FPGA (Field Programmable Gate Array), and the hardware may implement part or all of the functional blocks. For example, processor 1001 may be implemented by at least one of these pieces of hardware.

(Notification and Signaling of Information)

The notification of information is not limited to the aspects or embodiments described in the present specification, and the information may be notified by another method. For example, the notification of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, or the like.

(Adaptive System)

The aspects and embodiments described in the present specification may be applied to a system using LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or to a next-generation system extended based on the above systems.

(Processing Procedure and the Like)

The orders of the processing procedures, the sequences, the flow charts, and the like of the aspects and embodiments described in the present specification may be changed as long as there is no contradiction. For example, elements of various steps are presented in exemplary orders in the methods described in the present specification, and the methods are not limited to the presented specific orders.

(Operation of Base Station)

Specific operations which are described in the specification as being performed by the base station (radio base station) may sometimes be performed by an upper node depending on the situation. Various operations performed for communication with a terminal in a network constituted by one network node or a plurality of network nodes including a base station can be obviously performed by the base station and/or a network node other than the base station (examples include, but not limited to, MME (Mobility Management Entity) or S-GW (Serving Gateway)). Although there is one network node in addition to the base station in the case illustrated above, a plurality of other network nodes may be combined (for example, MME and S-GW).

(Direction of Input and Output)

The information, the signals, and the like can be output from a higher layer (or a lower layer) to a lower layer (or a higher layer). The information, the signals, and the like may be input and output through a plurality of network nodes.

(Handling of Input and Output Information and the Like)

The input and output information and the like may be saved in a specific place (for example, memory) or may be managed by a management table. The input and output information and the like can be overwritten, updated, or additionally written. The output information and the like may be deleted. The input information and the like may be transmitted to another apparatus.

(Determination Method)

The determination may be made based on a value expressed by one bit (0 or 1), based on a Boolean value (true or false), or based on comparison with a numerical value (for example, comparison with a predetermined value).

(Software)

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, and the like may be transmitted and received through a transmission medium. For example, when the software is transmitted from a website, a server, or another remote source by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

(Information and Signals)

The information, the signals, and the like described in the present specification may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, or the like.

("System" and "Network")

The terms "system" and "network" used in the present specification can be interchangeably used.

(Names of Parameters and Channels)

The information, the parameters, and the like described in the present specification may be expressed by absolute values, by values relative to predetermined values, or by other corresponding information. For example, radio resources may be indicated by indices.

The names used for the parameters are not limited in any respect. Furthermore, the numerical formulas and the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

(Base Station)

The base station (radio base station) can accommodate one cell or a plurality of (for example, three) cells (also called sector). When the base station accommodates a plurality of cells, the entire coverage area of the base station can be divided into a plurality of smaller areas, and each of the smaller areas can provide a communication service based on a base station subsystem (for example, small base station for indoor, remote radio head(RRH)). The term "cell" or "sector" denotes part or all of the coverage area of the base station and/or of the base station subsystem that perform the communication service in the coverage. Furthermore, the terms "base station," "eNB," "cell," and "sector" can be interchangeably used in the present specification. The base station may be called a fixed station, a NodeB, an eNodeB (eNB), an access point, a femto cell, a small cell, or the like.

(Terminal)

The user terminal may be called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or UE (User Equipment) or by some other appropriate terms.

(Meaning and Interpretation of Terms)

As used herein, the term "determining" may encompass a wide variety of actions. For example, "determining" may be regarded as judging, calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing and the like. That is, "determining" may be regarded as a certain type of action related to determining.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When the terms are used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limiting and non-inclusive examples.

The reference signal can also be abbreviated as RS and may also be called a pilot depending on the applied standard. The correction RS may be called a TRS (Tracking RS), a PC-RS (Phase Compensation RS), a PTRS (Phase Tracking RS), or an additional RS. The demodulation RS and the correction RS may be called by other corresponding names, respectively. The demodulation RS and the correction RS may be specified by the same name (for example, demodulation RS).

The description "based on" used in the present specification does not mean "based only on," unless otherwise specifically stated. In other words, the description "based on" means both of "based only on" and "based at least on."

The "section" in the configuration of each apparatus may be replaced with "means," "circuit," "device," or the like.

The terms "including," "comprising," and modifications of these terms are intended to be inclusive just like the term "having," as long as the terms are used in the present specification or the appended claims. Furthermore, the term "or" used in the present specification or the appended claims is not intended to be an exclusive or.

The radio frame may be constituted by one frame or a plurality of frames in the time domain. The one frame or each of the plurality of frames may be called a subframe, a time unit, or the like in the time domain. The subframe may be further constituted by one slot or a plurality of slots in the time domain. The slot may be further constituted by one symbol or a plurality of symbols (OFDM (Orthogonal Frequency Division Multiplexing) symbol, SC-FDMA (Single Carrier-Frequency Division Multiple Access) symbol, or the like) in the time domain.

The radio frame, the subframe, the slot, the mini-slot, and the symbol indicate time units in transmitting signals. The radio frame, the subframe, the slot, the mini-slot, and the symbol may be called by other corresponding names.

For example, in the LTE system, the base station creates a schedule for assigning radio resources to each mobile station (such as frequency bandwidth that can be used by each mobile station and transmission power). The minimum time unit of scheduling may be called a TTI (Transmission Time Interval) or one mini-slot may be called a TTI.

For example, one subframe, a plurality of continuous subframes, or one slot may be called a TTI.

The resource unit is a resource assignment unit in the time domain and the frequency domain, and the resource unit may include one subcarrier or a plurality of continuous subcarriers in the frequency domain. In addition, the resource unit may include one symbol or a plurality of symbols in the time domain, and may have a length of one slot, one mini-slot, one subframe, or one TTI. One TTI and one subframe may be constituted by one resource unit or a plurality of resource units. The resource unit may be called a resource block (RB), a physical resource block (PRB: Physical RB), a PRB pair, an RB pair, a scheduling unit, a frequency unit, or a subband. The resource unit may be constituted by one RE or a plurality of REs. For example, one RE only has to be a resource smaller in unit size than the resource unit serving as a resource assignment unit (for example, one RE only has to be a minimum unit of resource), and the naming is not limited to RE.

The structure of the radio frame described above is illustrative only, and the number of subframes included in the radio frame, the number of slots included in the subframe, the number of mini-slots included in the subframe, the numbers of symbols and resource blocks included in the slot, and the number of subcarriers included in the resource block can be changed in various ways.

When articles, such as "a," "an," and "the" in English, are added by translation in the entire disclosure, the articles include plural forms unless otherwise clearly indicated by the context.

(Variations and the Like of Aspects)

The aspects and embodiments described in the present specification may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present invention has been described in detail, it is obvious to those skilled in the art that the present invention is not limited to the embodiments described in the present specification. Modifications and variations of the aspects of the present invention can be made without departing from the spirit and the scope of the present invention defined by the description of the appended claims. Therefore, the description of the present specification is intended for exemplary description and does not limit the present invention in any sense.

The present patent application claims the benefit of priority based on Japanese Patent Application No. 2017-041723 filed on Mar. 6, 2017, and the entire content of Japanese Patent Application No. 2017-041723 is hereby incorporated by reference.

INDUSTRIAL APPLICABILITY

An aspect of the present invention is useful for a mobile communication system.

REFERENCE SIGNS LIST 10, 50, 60, 70 Transmission apparatus
20, 200, 1200 Reception apparatus
101 Discovery signal generation section
102 Reference signal generation section
103 Transmission data generation section
104 Pre-coding section
105, 212 Signal conversion section
106-1 to 106-L IFFT section
107-1 to 107-L GI addition section
108-1 to 108-L DAC
109, 209, 509, 609, 709, 1209 Analog BF (Beamforming) circuit
110, 210, 510, 710, 1210 High-speed switching circuit
111, 211, 400, 511, 711-1, 711-2, 1211 Orthogonal beam fixed BF (Beamforming) circuit
112-1 to 112-$N_T$, 201-1 to 201-$N_R$, 208-1 to 208-$N_R$, 713-1 to 713-$N_T$, 714-1 to 714-$N_T$ Antenna port
113, 221 Beam selection section
114 Pre-coding matrix generation section
202-1 to 202-$N_R$ Communication section
203, 216 Beam determination section
204, 217 Channel estimation section
205, 218 Post-coding matrix generation section
206, 219 Post-coding section
207, 220 Data processing section
300, 310, 320, 330, 340 Butler matrix
301-1 to 301-4, 311-1 to 311-12, 321, 331, 341 Hybrid
302-1, 302-2, 314-1 to 314-4 −45° fixed phase shifter
303-1, 303-2, 315-1 to 315-4 Cross-coupler
312-1, 312-2 −67.5° fixed phase shifter
313-1, 313-2 −22.5° fixed phase shifter
332-1, 332-2 8×8 Butler matrix
342-1 to 342-4 4×4 Butler matrix
401 Patch array antenna feed circuit
402 Dielectric lens
512 Distribution circuit
612, 712-1, 712-2 High-speed analog phase adjustment circuit
713, 714 Antenna port group
1212 Partial synthesis circuit

The invention claimed is:

1. A transmission and reception apparatus comprising a plurality of antenna ports, the transmission and reception apparatus comprising:
a transmission and reception circuit; and
an orthogonal beam fixed beamforming circuit and a high-speed switching circuit between the transmission and reception circuit and the antenna ports,
wherein the high-speed switching circuit receives L transmission signals (L is an integer larger than or equal to 2) from the transmission and reception circuit, selects L ports among N ports (N is an integer larger than or equal to L) provided at the orthogonal beam fixed beamforming circuit, and outputs the L transmission signals to the selected L ports, respectively,
the transmission and reception circuit outputs a transmission signal subjected to transmission signal processing to the high-speed switching circuit during signal transmission,
the high-speed switching circuit selects at least one port from a plurality of ports provided at the orthogonal beam fixed beamforming circuit and outputs the transmission signal to the selected port,
the orthogonal beam fixed beamforming circuit forms a beam corresponding to the selected port to transmit the transmission signal,
the transmission and reception circuit performs reception signal processing on a received signal output from the high-speed switching circuit during signal reception,
the high-speed switching circuit selects at least one port from the plurality of ports provided at the orthogonal beam fixed beamforming circuit and acquires the received signal from the selected port, and the orthogonal beam fixed beamforming circuit forms a beam corresponding to the selected port to receive the received signal.

2. The transmission and reception apparatus according to claim 1, further comprising:
a plurality of the orthogonal beam fixed beamforming circuits referred to as first to M-th (where M is an integer equal to or greater than 2) orthogonal beam fixed beamforming circuits;
first to M-th high-speed analog phase adjustment circuits respectively connected to the first to the M-th orthogonal beam fixed beamforming circuits; and
first to M-th antenna port groups respectively connected to the first to the M-th high-speed analog phase adjustment circuits, wherein:
the high-speed switching circuit is connected to the first to the M-th orthogonal beam fixed beamforming circuits; and
the first to the M-th high-speed analog phase adjustment circuits respectively provide first to M-th angle offsets to transmission signals or received signals.

3. The transmission and reception apparatus according to claim 2,
wherein a difference between the first angle offset and the second angle offset is 1/N of an angle difference between adjacent beams of N beams which are orthogonal to each other.

4. The transmission and reception apparatus according to claim 2,
wherein the first to the M-th antenna port groups have physical antenna arrangements which are different from each other.

5. A transmission and reception apparatus comprising a plurality of antenna ports, the transmission and reception apparatus comprising:
a transmission and reception circuit;
an orthogonal beam fixed beamforming circuit and a high-speed switching circuit between the transmission and reception circuit and the antenna ports,
wherein the high-speed switching circuit receives L transmission signals (L is an integer larger than or equal to 2) from the transmission and reception circuit, selects L ports among N ports (N is an integer larger than or equal to L) provided at the orthogonal beam fixed beamforming circuit, and outputs the L transmission signals to the selected L ports, respectively; and
a distribution and synthesis circuit provided between the high-speed switching circuit and the orthogonal beam fixed beamforming circuit, the distribution and synthesis circuit branching a transmission signal output from the high-speed switching circuit to output the branched transmission signals to the orthogonal beam fixed beamforming circuit and partially synthesizing received signals output from the orthogonal beam fixed beamforming circuit.

6. A transmission and reception apparatus comprising a plurality of antenna ports, the transmission and reception apparatus comprising:
a transmission and reception circuit; and
an orthogonal beam fixed beamforming circuit and a high-speed switching circuit between the transmission and reception circuit and the antenna ports,
wherein the high-speed switching circuit receives L transmission signals (L is an integer larger than or equal to 2) from the transmission and reception circuit, selects L ports among N ports (N is an integer larger than or equal to L) provided at the orthogonal beam fixed beamforming circuit, and outputs the L transmission signals to the selected L ports, respectively, and
a high-speed analog phase adjustment circuit provided between the orthogonal beam fixed beamforming circuit and the antenna ports, the high-speed analog phase adjustment circuit providing angle offsets to a plurality of transmission signals or received signals, wherein:
the transmission signals are transmitted using beams having different angle offsets in accordance with transmission timings; and
the received signals are received using beams having different angle offsets in accordance with reception timings.

* * * * *